US012536626B2

(12) United States Patent
Amirghodsi et al.

(10) Patent No.: US 12,536,626 B2
(45) Date of Patent: Jan. 27, 2026

(54) MASK-ROBUST IMAGE INPAINTING UTILIZING MACHINE-LEARNING MODELS

(71) Applicant: Adobe Inc., San Jose, CA (US)

(72) Inventors: Sohrab Amirghodsi, Seattle, WA (US); Lingzhi Zhang, Philadelphia, PA (US); Connelly Barnes, Seattle, WA (US); Elya Shechtman, Seattle, WA (US); Yuqian Zhou, Urbana, IL (US); Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 461 days.

(21) Appl. No.: 18/307,546

(22) Filed: Apr. 26, 2023

(65) Prior Publication Data

US 2024/0362757 A1 Oct. 31, 2024

(51) Int. Cl.
*G06T 5/77* (2024.01)
*G06T 5/30* (2006.01)
*G06T 5/50* (2006.01)
*G06T 7/11* (2017.01)

(52) U.S. Cl.
CPC .................. *G06T 5/77* (2024.01); *G06T 5/30* (2013.01); *G06T 5/50* (2013.01); *G06T 7/11* (2017.01); *G06T 2207/20076* (2013.01); *G06T 2207/20081* (2013.01); *G06T 2207/20084* (2013.01)

(58) Field of Classification Search
CPC .... G06T 5/77; G06T 5/30; G06T 5/50; G06T 7/11; G06T 2207/20076; G06T 2207/20081; G06T 2207/20084

USPC ......................................................... 382/155
See application file for complete search history.

(56) References Cited

U.S. PATENT DOCUMENTS

2022/0392025 A1* 12/2022 Mironica .................. G06T 5/50
2023/0259587 A1* 8/2023 Lin ........................... G06N 3/08
2023/0342890 A1* 10/2023 Kanazawa ............... G06T 11/20
2024/0046429 A1* 2/2024 Amirghodsi .............. G06T 7/11
2024/0127412 A1* 4/2024 Lin ........................... G06T 7/11

OTHER PUBLICATIONS

Chao Yang, Xin Lu, Zhe Lin, Eli Shechtman, Oliver Wang, and Hao Li. High-resolution image inpainting using multi-scale neural patch synthesis. In Proceedings of the IEEE conference on computer vision and pattern recognition, pp. 6721-6729, 2017.

(Continued)

*Primary Examiner* — Gabriel I Garcia
(74) *Attorney, Agent, or Firm* — Keller Preece PLLC

(57) ABSTRACT

The present disclosure relates to systems, non-transitory computer-readable media, and methods for inpainting digital images utilizing mask-robust machine-learning models. In particular, in one or more embodiments, the disclosed systems obtain an initial mask for an object depicted in a digital image. Additionally, in some embodiments, the disclosed systems generate, utilizing a mask-robust inpainting machine-learning model, an inpainted image from the digital image and the initial mask. Moreover, in some implementations, the disclosed systems generate a relaxed mask that expands the initial mask. Furthermore, in some embodiments, the disclosed systems generate a modified image by compositing the inpainted image and the digital image utilizing the relaxed mask.

20 Claims, 17 Drawing Sheets

(56) References Cited

OTHER PUBLICATIONS

Chaohao Xie, Shaohui Liu, Chao Li, Ming-Ming Cheng, Wangmeng Zuo, Xiao Liu, Shilei Wen, and Errui Ding. Image inpainting with learnable bidirectional attention maps In Proceedings of the IEEE/CVF International Conference on Computer Vision, pp. 8858-8867, 2019.

Chuanxia Zheng, Tat-Jen Cham, and Jianfei Cai. Pluralistic image completion. In Proceedings of the IEEE/CVF Conference on Computer Vision and Pattern Recognition, pp. 1438-1447, 2019.

Connelly Barnes, Eli Shechtman, Adam Finkelstein, and Dan B Goldman. Patchmatch: A randomized correspondence algorithm for structural image editing. ACM Trans. Graph., 28(3):24, 2009.

Guilin Liu, Fitsum A Reda, Kevin J Shih, Ting-Chun Wang, Andrew Tao, and Bryan Catanzaro. Image inpainting for irregular holes using partial convolutions. In Proceedings of the European Conference on Computer Vision (ECCV), pp. 85-100, 2018.

Haitian Zheng, Zhe Lin, Jingwan Lu, Scott Cohen, Eli Shechtman, Connelly Barnes, Jianming Zhang, Ning Xu, Sohrab Amirghodsi, and Jiebo Luo. Cm-gan: Image inpainting with cascaded modulation gan and object-aware training. arXiv preprint arXiv:2203.11947, 2022.

Haoran Zhang, Zhenzhen Hu, Changzhi Luo, Wangmeng Zuo, and Meng Wang. Semantic image inpainting with progressive generative networks. In Proceedings of the 26th ACM international conference on Multimedia, pp. 1939-1947, 2018.

Hongyu Liu, Bin Jiang, Yi Xiao, and Chao Yang. Coherent semantic attention for image inpainting. In Proceedings of the IEEE/CVF International Conference on Computer Vision, pp. 4170-4179, 2019.

Hongyu Liu, Ziyu Wan, Wei Huang, Yibing Song, Xintong Han, and Jing Liao. Pd-gan: Probabilistic diverse gan for image inpainting. In Proceedings of the IEEE/CVF Conference on Computer Vision and Pattern Recognition, pp. 9371-9599 9381, 2021.

Jiahui Yu, Zhe Lin, Jimei Yang, Xiaohui Shen, Xin Lu, and Thomas S Huang. Free-form image inpainting with gated convolution. In Proceedings of the IEEE/CVF International Conference on Computer Vision, pp. 4471-4480, 2019.

Jiahui Yu, Zhe Lin, Jimei Yang, Xiaohui Shen, Xin Lu, and Thomas S Huang. Generative image inpainting with contextual attention. In Proceedings of the IEEE conference on computer vision and pattern recognition, pp. 5505-5514, 2018.

Jialun Peng, Dong Liu, Songcen Xu, and Houqiang Li. Generating diverse structure for image inpainting with hierarchical vq-vae. In Proceedings of the IEEE/CVF Conference on Computer Vision and Pattern Recognition, pp. 10775-10784, 2021.

Jie Yang, Zhiquan Qi, and Yong Shi. Learning to incorporate structure knowledge for image inpainting. In Proceedings of the AAAI Conference on Artificial Intelligence, vol. 34, pp. 12605-12612, 2020.

Jingyuan Li, Fengxiang He, Lefei Zhang, Bo Du, and Dacheng Tao. Progressive reconstruction of visual structure for image inpainting. In Proceedings of the IEEE/CVF Inter-national Conference on Computer Vision, pp. 5962-5971, 2019.

Jingyuan Li, Ning Wang, Lefei Zhang, Bo Du, and Dacheng Tao. Recurrent feature reasoning for image inpainting. In Proceedings of the IEEE/CVF Conference on Computer Vision and Pattern Recognition, pp. 7760-7768, 2020.

Kamyar Nazeri, Eric Ng, Tony Joseph, Faisal Z Qureshi, and Mehran Ebrahimi. Edgeconnect: Generative image inpainting with adversarial edge learning. arXiv preprint arXiv:1901.00212, 2019.

Lei Zhao, Qihang Mo, Sihuan Lin, Zhizhong Wang, Zhiwen 712 Zuo, Haibo Chen, Wei Xing, and Dongming Lu. Uctgan: Diverse image inpainting based on unsupervised cross-space translation. In Proceedings of the IEEE/CVF Conference on Computer Vision and Pattern Recognition, pp. 5741-5750, 2020.

Liang Liao, Jing Xiao, Zheng Wang, Chia-Wen Lin, and Shinichi Satoh. Guidance and evaluation: Semantic-aware image inpainting for mixed scenes. In Computer Vision—ECCV 2020: 16th European Conference, Glasgow, UK, Aug. 23-28, 2020, Proceedings, Part XXVII 16, pp. 683-700. Springer, 2020.

Lingzhi Zhang, Connelly Barnes, Kevin Wampler, Sohrab Amirghodsi, Eli Shechtman, Zhe Lin, and Jianbo Shi. Inpainting at modern camera resolution by guided patchmatch with auto-curation. arXiv preprint arXiv:2208.03552, 2022.

Lingzhi Zhang, Jiancong Wang, and Jianbo Shi. Multimodal image outpainting with regularized normalized diversification. In Proceedings of the IEEE/CVF Winter Conference on Applications of Computer Vision, pp. 3433-3442, 2020.

Lingzhi Zhang, Yuqian Zhou, Connelly Barnes, Sohrab Amirghodsi, Zhe Lin, Eli Shechtman, and Jianbo Shi. Perceptual artifacts localization for inpainting. arXiv preprint arXiv:2208.03357, 2022.

Lu Chi, Borui Jiang, and Yadong Mu. Fast fourier convolution. Advances in Neural Information Processing Systems, 33, 2020.

Marcelo Bertalmio, Guillermo Sapiro, Vincent Caselles, and Coloma Ballester. Image inpainting. In Proceedings of the 27th annual conference on Computer graphics and interactive techniques, pp. 417-424, 2000.

Ning Wang, Sihan Ma, Jingyuan Li, Yipeng Zhang, and Lefei Zhang. Multistage attention network for image inpainting. Pattern Recognition, 106:107448, 2020.

Radhakrishna Achanta, Appu Shaji, Kevin Smith, Aurelien Lucchi, Pascal Fua, and Sabine Sü sstrunk. Slic superpixels. Technical report, 2010.

Raymond A Yeh, Chen Chen, Teck Yian Lim, Alexander G Schwing, Mark Hasegawa-Johnson, and Minh N Do. Semantic image inpainting with deep generative models. In Proceedings of the IEEE conference on computer vision and pattern recognition, pp. 5485-5493, 2017.

Roman Suvorov, Elizaveta Logacheva, Anton Mashikhin, Anastasia Remizova, Arsenii Ashukha, Aleksei Silvestrov, Naejin Kong, Harshith Goka, Kiwoong Park, and Victor Lempitsky. Resolution-robust large mask inpainting with fourier convolutions. arXiv preprint arXiv:2109.07161, 2021.

Satoshi Iizuka, Edgar Simo-Serra, and Hiroshi Ishikawa. Globally and locally consistent image completion. ACM Transactions on Graphics (ToG), 36(4):1-14, 2017.

Tengfei Wang, Hao Ouyang, and Qifeng Chen. Image inpainting with external-internal learning and monochromic bottleneck. In Proceedings of the IEEE/CVF Conference on Computer Vision and Pattern Recognition, pp. 5120-5129, 2021.

Tete Xiao, Yingcheng Liu, Bolei Zhou, Yuning Jiang, and Jian Sun. Unified perceptual parsing for scene understanding. In Proceedings of the European conference on computer vision (ECCV), pp. 418-434, 2018.

Wei Xiong, Jiahui Yu, Zhe Lin, Jimei Yang, Xin Lu, Con-nelly Barnes, and Jiebo Luo. Foreground-aware image inpainting. In Proceedings of the IEEE/CVF Conference on Computer Vision and Pattern Recognition, pp. 5840-5848, 2019.

Weiwei Cai and Zhanguo Wei. Piigan: generative adversarial networks for pluralistic image inpainting. IEEE Access, 8:48451-48463, 2020.

Xiefan Guo, Hongyu Yang, and Di Huang. Image inpainting via conditional texture and structure dual generation. In Proceedings of the IEEE/CVF International Conference on Computer Vision, pp. 14134-14143, 2021.

Xintong Han, Zuxuan Wu, Weilin Huang, Matthew R Scott, and Larry S Davis. Finet: Compatible and diverse fashion image inpainting. In Proceedings of the IEEE/CVF International Conference on Computer Vision, pp. 4481-4491, 2019.

Yanhong Zeng, Jianlong Fu, Hongyang Chao, and Baining Guo. Learning pyramid-context encoder network for high-quality image inpainting. In Proceedings of the IEEE/CVF Conference on Computer Vision and Pattern Recognition, pp. 1486-1494, 2019.

Yi Wang, Xin Tao, Xiaojuan Qi, Xiaoyong Shen, and Jiaya Jia. Image inpainting via generative multi-column convolutional neural networks. arXiv preprint arXiv:1810.08771, 2018.

Yingchen Yu, Fangneng Zhan, Rongliang Wu, Jianxiong Pan, Kaiwen Cui, Shijian Lu, Feiying Ma, Xuansong Xie, and Chunyan Miao. Diverse image inpainting with bidirectional and autoregressive transformers. arXiv preprint arXiv:2104.12335, 2021.

(56) References Cited

OTHER PUBLICATIONS

Yu Zeng, Zhe Lin, Jimei Yang, Jianming Zhang, Eli Shechtman, and Huchuan Lu. High-resolution image inpainting with iterative confidence feedback and guided upsampling. In European Conference on Computer Vision, pp. 1-17. Springer, 2020.

Yuhang Song, Chao Yang, Yeji Shen, Peng Wang, Qin Huang, and C-C Jay Kuo. Spg-net: Segmentation prediction and guidance network for image inpainting. arXiv preprint arXiv:1805.03356, 2018.

Yurui Ren, Xiaoming Yu, Ruonan Zhang, Thomas H Li, Shan Liu, and Ge Li. Structureflow: Image inpainting via structure-aware appearance flow. In Proceedings of the IEEE/CVF International Conference on Computer Vision, pp. 181-190, 2019.

Ze Liu, Yutong Lin, Yue Cao, Han Hu, Yixuan Wei, Zheng Zhang, Stephen Lin, and Baining Guo. Swin transformer: Hierarchical vision transformer using shifted windows. In Proceedings of the IEEE/CVF International Conference on Computer Vision, pp. 10012-10022, 2021.

Zili Yi, Qiang Tang, Shekoofeh Azizi, Daesik Jang, and Zhan Xu. Contextual residual aggregation for ultra high-resolution image inpainting. In Proceedings of the IEEE/CVF Conference on Computer Vision and Pattern Recognition, pp. 7508-7517, 2020.

Ziyu Wan, Jingbo Zhang, Dongdong Chen, and Jing Liao High-fidelity pluralistic image completion with transformers. arXiv preprint arXiv:2103.14031, 2021.

Zongyu Guo, Zhibo Chen, Tao Yu, Jiale Chen, and Sen Liu. Progressive image inpainting with full-resolution residual network. In Proceedings of the 27th acm international conference on multimedia, pp. 2496-2504, 2019.

\* cited by examiner

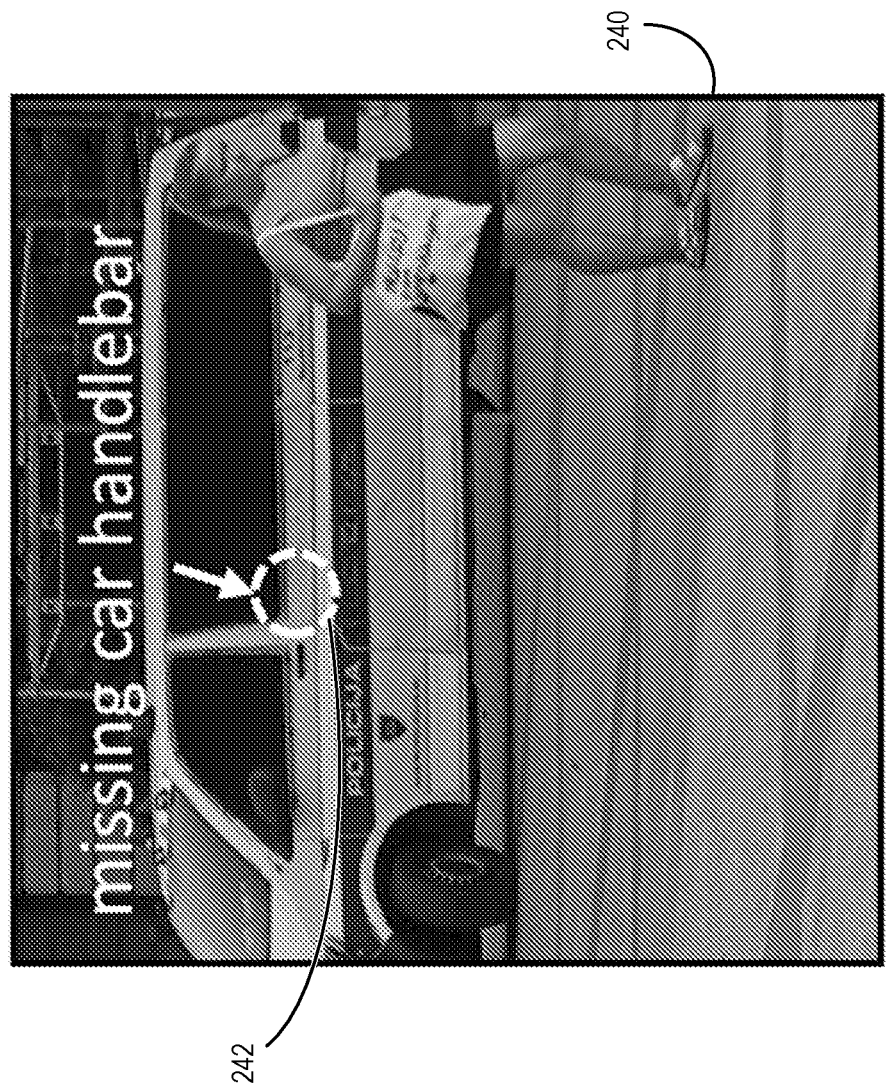
Fig. 2C (Prior Art) Fill with Large Uniform Dilation

MASK-ROBUST IMAGE INPAINTING UTILIZING MACHINE-LEARNING MODELS

BACKGROUND

Recent years have seen developments in hardware and software platforms implementing image inpainting models for digital images. For example, conventional inpainting systems can remove portions of a digital image and fill gaps with inpainted image content. To illustrate, conventional inpainting systems attempt to predict portions of the digital image that would have been captured in the original digital image if the removed portions had been absent. Despite these developments, conventional systems suffer from a number of technical deficiencies, including inaccuracy (by generating unrealistic and imprecise inpainted content) and inflexibility (by requiring that objects to be removed be accurately masked).

BRIEF SUMMARY

Embodiments of the present disclosure provide benefits and/or solve one or more problems in the art with systems, non-transitory computer-readable media, and methods for inpainting images with imperfect masks utilizing machine-learning models. To illustrate, in some embodiments, the disclosed systems generate an inpainted image from an input digital image and an input initial mask utilizing a robust inpainting model (e.g., a mask-robust inpainting machine-learning model as described below). With the generated inpainted image, in some implementations, the disclosed systems utilize a relaxed mask to composite the inpainted digital image with the input digital image to generate an output modified digital image. In addition, the disclosed systems can utilize a leftover artifacts detection model that can detect and segment residual leftover object pieces or artifacts after inpainting and iteratively refine such artifacts.

Additionally, in some embodiments, the disclosed systems utilize a novel training paradigm that directly trains an inpainting model with real object removal data, which significantly improves the robustness to real world inpainting cases. Indeed, in some implementations, the disclosed systems generate pseudo-ground-truth inpainted images from input digital images and input initial masks. In particular, in some embodiments, the disclosed systems dilate the input initial masks and process the input digital images with the dilated masks utilizing an inpainting machine-learning model to generate pseudo-ground truths. In some implementations, the disclosed systems generate inpainted images from the input digital images and the input initial masks utilizing the robust inpainting model, and compare the inpainted images with the pseudo-ground-truth inpainted images to tune parameters of the robust inpainting model. Testing on imperfect masks illustrates that the disclosed system can significantly improve accuracy over pertinent baselines.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIGS. 2A-2C illustrate some deficiencies of conventional inpainting systems.

DETAILED DESCRIPTION

Figure 1:
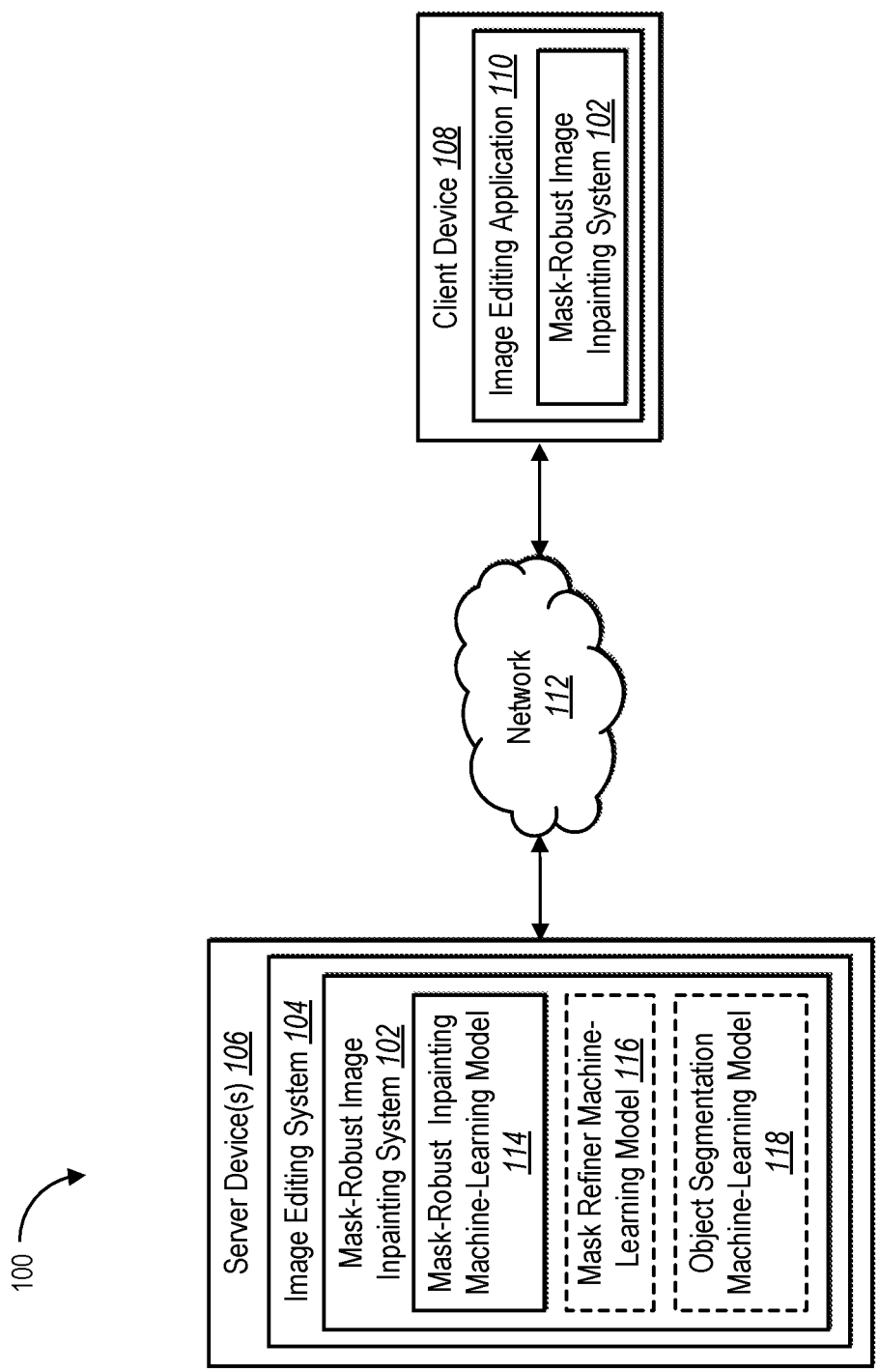
FIG. 1 illustrates a diagram of an environment in which a mask-robust image inpainting system operates in accordance with one or more embodiments.

This disclosure describes one or more embodiments of a mask-robust image inpainting system that inpaints digital images with imperfect masks for objects portrayed in the digital images. In particular, in one or more embodiments the mask-robust image inpainting system generates pseudo ground truth pixels corresponding to real-world object masks and thus allows fine-tuning the inpainting models to be robust to imperfect real-world masks. In addition, mask-robust image inpainting system can utilize an additional machine learning model that can detect leftover artifacts on the inpainted images, which also effectively improves the inpainting success rate in real world use cases.

For example, in some implementations, the mask-robust image inpainting system obtains an input digital image and an input initial mask, and generates an inpainted image for the digital image utilizing a mask-robust inpainting machine-learning model. The mask-robust image inpainting system also generates a modified digital image based on the inpainted image, while preserving original pixels from the input digital image. For instance, in some embodiments, the mask-robust image inpainting system composites a portion of the generated inpainted image with a portion of the input digital image to create the modified digital image. The mask-robust image inpainting system composites the inpainted image and the input digital image by generating a relaxed mask that expands the initial mask.

Additionally, in some embodiments, the mask-robust image inpainting system trains the mask-robust inpainting machine-learning model to generate the inpainted image. For example, the mask-robust image inpainting system generates a pseudo-ground-truth inpainted image from the input digital image and the input initial mask. To illustrate, the mask-robust image inpainting system dilates the input initial mask and processes the input digital image with the dilated mask utilizing an inpainting machine-learning model. In some embodiments, the mask-robust image inpainting system generates an inpainted image from the input digital image and the input initial mask utilizing the mask-robust inpainting machine-learning model, and compares the inpainted image with the pseudo-ground-truth inpainted image to determine a measure of loss. In this way, the mask-robust image inpainting system tunes parameters of the mask-robust inpainting machine-learning model (based on the measure of loss) to more accurately account for inaccuracies in the input mask.

To illustrate, real-world inpainting scenarios involve masks that generally do not perfectly cover objects to be removed from digital images. For instance, a mask might generally trace an outline of an object, but some pixels representing part of the object often are outside of the mask. In one or more implementations, the mask-robust image inpainting system is more robust to these imperfect masks. Specifically, in one or more implementations the mask-robust image inpainting system trains machine-learning models to inpaint digital images with real-world digital images depicting objects with imperfect masks that do not completely cover the objects. Thus, the mask-robust image inpainting system more successfully and accurately removes the objects and inpaints the images with replacement content, despite imperfect masks that incorrectly identify the foreground object. Accordingly, the mask-robust image inpainting system does not require precise masks for inpainting a digital image.

In some embodiments, the mask-robust image inpainting system trains the one or more machine-learning models to perform the inpainting techniques described herein. For instance, the mask-robust image inpainting system generates pseudo-ground-truth inpainted images utilizing sufficiently dilated masks to remove objects from the pseudo-ground-truth inpainted images. Moreover, the mask-robust image inpainting system populates gaps left from the removed objects with plausible background pixels, thereby providing realistic ground truths (i.e., "pseudo-ground-truth" inpainted images) to train the machine-learning models utilizing real-world datasets of images with imperfect masks.

Additionally, in some implementations, the mask-robust image inpainting system detects artifacts leftover from an inpainting process, removes those leftover artifacts, and inpaints the images to fill in the gaps from the removed artifacts. In this way, the mask-robust image inpainting system more completely removes objects from an inpainted image, thereby providing realistic outputs from the inpainting process.

Although conventional inpainting systems can provide inpainted content for portions of a digital image, such systems have a number of problems in relation to accuracy and flexibility of operation. For instance, conventional systems inaccurately inpaint digital images with imperfect masks. Specifically, conventional systems populate portions of digital images with unrealistic and inaccurate pixels influenced by portions of an object that should have been included in the masks. For example, if a mask of a person does not fully cover the person in a digital image, those portions of the person that are not masked influence the inpainting process, such that the inpainted portions have unrealistic artifacts. Moreover, conventional systems are often unable to accurately inpaint portions outside of the provided mask. Accordingly, if a mask is imperfect, the inaccurate regions outside of the mask remain within the inpainted digital image.

Moreover, conventional systems inflexibly require that masks be accurate or near-perfect (e.g., completely cover an object to be removed) to provide plausible results. Specifically, conventional systems are sensitive to imperfect masks, in that errors in the mask often influence conventional systems to produce errors in the inpainted content. Thus, conventional systems are not robust to gaps in masks of objects, thereby requiring that masks be near-perfect and complete in order for conventional systems to yield plausible inpainted images.

Additionally, conventional systems inflexibly require burdensome interactions to overcome imperfect masks. Specifically, conventional systems require a number of user interactions and additional processes to correct masks and/or dilate the masks so that they fully cover objects to be removed from a digital image before inpainting. In this way, conventional systems impose on user devices an undue number of interactions and inefficiencies to rectify the problems described above.

The mask-robust image inpainting system provides a variety of technical advantages relative to conventional systems. For example, by utilizing machine-learning models trained with real-world datasets with imperfect masks, the mask-robust image inpainting system improves accuracy relative to conventional systems. Specifically, the mask-robust image inpainting system accurately removes objects and inpaints in their place with realistic background content. In addition, by more accurately excluding portions of a removed object from an image, the mask-robust image inpainting system ensures that the inpainted content is not incorrectly influenced by such otherwise-retained portions. Moreover, the mask-robust image inpainting system can modify pixels inside and outside of a mask to more accurately correct image regions that were not accurately classified from the input mask.

Additionally, the mask-robust image inpainting system provides enhanced flexibility relative to conventional systems. For example, by utilizing machine-learning models that are trained from real-world datasets with imperfect masks, the mask-robust image inpainting system is robust to masking failures and does not require perfect masks to successfully inpaint a digital image.

Moreover, the mask-robust image inpainting system provides added flexibility and efficiency over conventional systems by reducing the inputs and user interactions required to inpaint a digital image. For instance, the mask-robust image inpainting system reduces the need for user interfaces and user interactions to correct an imperfect mask. In addition, the mask-robust image inpainting system alleviates inputs such as clicks and text entries to dilate a mask and process the image and mask to perform inpainting.

Additional detail will now be provided in relation to illustrative figures portraying example embodiments and implementations of a mask-robust image inpainting system. For example, FIG. 1 illustrates a system 100 (or environment) in which a mask-robust image inpainting system 102 operates in accordance with one or more embodiments. As illustrated, the system 100 includes server device(s) 106, a network 112, and a client device 108. As further illustrated, the server device(s) 106 and the client device 108 communicate with one another via the network 112.

As shown in FIG. 1, the server device(s) 106 includes an image editing system 104 that further includes the mask-robust image inpainting system 102. In some embodiments, the mask-robust image inpainting system 102 generates a modified digital image from a digital image and an initial mask for an object depicted in the digital image. In some embodiments, the mask-robust image inpainting system 102 trains a mask-robust inpainting machine-learning model 114. In some embodiments, the server device(s) 106 includes, but is not limited to, a computing device (such as explained below with reference to FIG. 13).

In some instances, the mask-robust image inpainting system 102 receives a request (e.g., from the client device 108) to inpaint one or more digital visual media items (e.g., a digital image, a digital video). For example, the request includes an instruction to remove a portion of a digital image (e.g., a portion of the digital image depicting a particular object), and to inpaint the digital image (e.g., by generating replacement pixels for the removed portion). Some embodiments of server device(s) 106 are operated by a user to perform a variety of functions via the image editing system 104 on the server device(s) 106. For example, the server device(s) 106 (through the mask-robust image inpainting system 102 on the image editing system 104) performs functions such as, but not limited to, receiving one or more digital images, generating or receiving one or more initial masks for one or more objects depicted in the one or more digital images, generating one or more inpainted digital images from the one or more digital images and the one or more initial masks, and/or generating one or more modified digital images from the one or more inpainted digital images and the one or more digital images. In some embodiments, the server device(s) 106 utilizes a mask-robust inpainting machine-learning model 114 to generate the one or more inpainted digital images. In one or more embodiments, the server device(s) 106 utilizes an object segmentation machine-learning model 118 to generate the one or more initial masks. In one or more implementations, the server device(s) 106 utilizes a mask refiner machine-learning model 116 to generate one or more relaxed masks that expand the one or more initial masks. In some embodiments, the server device(s) 106 trains the mask-robust inpainting machine-learning model 114 and/or the mask refiner machine-learning model 116 as described herein. In some implementations, the server device(s) 106 utilize an additional inpainting machine-learning model to generate one or more pseudo-ground-truth inpainted images. In one or more implementations, the server device(s) 106 utilize the one or more pseudo-ground-truth inpainted images to train the mask-robust inpainting machine-learning model 114 and/or the mask refiner machine-learning model 116.

Furthermore, as shown in FIG. 1, the system 100 includes the client device 108. In some embodiments, the client device 108 includes, but is not limited to, a mobile device (e.g., a smartphone, a tablet), a laptop computer, a desktop computer, or any other type of computing device, including those explained below with reference to FIG. 13. Some embodiments of client device 108 are operated by a user to perform a variety of functions via an image editing application 110 on client device 108. For example, the client device 108 (through the image editing application 110) performs functions such as, but not limited to, capturing or receiving one or more digital images, generating or receiving one or more initial masks for one or more objects depicted in the one or more digital images, generating one or more inpainted digital images from the one or more digital images and the one or more initial masks, and/or generating one or more modified digital images from the one or more inpainted digital images and the one or more digital images. In some embodiments, the client device 108 utilizes the mask-robust inpainting machine-learning model to generate the one or more inpainted digital images. In one or more embodiments, the client device 108 utilizes the object segmentation machine-learning model to generate the one or more initial masks. In one or more implementations, the client device 108 utilizes the mask refiner machine-learning model to generate one or more relaxed masks that expand the one or more initial masks. In some embodiments, the client device 108 trains the mask-robust inpainting machine-learning model and/or the mask refiner machine-learning model as described herein.

To access the functionalities of the mask-robust image inpainting system 102 (as described above and in greater detail below), in one or more embodiments, a user interacts with the image editing application 110 on the client device 108. For example, the image editing application 110 includes one or more software applications (e.g., to interact with and/or modify digital images in accordance with one or more embodiments described herein) installed on the client device 108, such as a mask-robust image inpainting application. In certain instances, the image editing application 110 is hosted on the server device(s) 106. Additionally, when hosted on the server device(s) 106, the image editing application 110 is accessed by the client device 108 through a web browser and/or another online interfacing platform and/or tool.

As illustrated in FIG. 1, in some embodiments, the mask-robust image inpainting system 102 is hosted by the image editing application 110 on the client device 108 (e.g., additionally or alternatively to being hosted by the image editing system 104 on the server device(s) 106). For example, the mask-robust image inpainting system 102 performs the image inpainting techniques described herein on the client device 108. In some implementations, the mask-robust image inpainting system 102 utilizes the server device(s) 106 to train and implement machine learning models (such as the mask-robust inpainting machine-learning model 114). In one or more embodiments, the mask-robust image inpainting system 102 utilizes the server device(s) 106 to train machine learning models (such as the mask-robust inpainting machine-learning model 114) and utilizes the client device 108 to implement or apply the machine learning models.

Further, although FIG. 1 illustrates the mask-robust image inpainting system 102 being implemented by a particular component and/or device within the system 100 (e.g., the server device(s) 106 and/or the client device 108), in some embodiments the mask-robust image inpainting system 102 is implemented, in whole or in part, by other computing devices and/or components in the system 100. For instance, in some embodiments, the mask-robust image inpainting system 102 is implemented on another client device. More specifically, in one or more embodiments, the description of (and acts performed by) the mask-robust image inpainting system 102 are implemented by (or performed by) the image editing application 110 on another client device.

In some embodiments, the image editing application 110 includes a web hosting application that allows the client device 108 to interact with content and services hosted on the server device(s) 106. To illustrate, in one or more implementations, the client device 108 accesses a web page or computing application supported by the server device(s) 106. The client device 108 provides input to the server device(s) 106 (e.g., files of digital images, selections of initial masks). In response, the mask-robust image inpainting system 102 on the server device(s) 106 performs operations described herein to inpaint one or more digital images. The server device(s) 106 provides the output or results of the operations (e.g., one or more inpainted digital images) to the client device 108. As another example, in some implementations, the mask-robust image inpainting system 102 on the client device 108 performs operations described herein to inpaint one or more digital images. The client device 108 provides the output or results of the operations (e.g., one or more inpainted digital images) via a display of the client device 108, and/or transmits the output or results of the operations to another device (e.g., the server device(s) 106 and/or another client device).

Additionally, as shown in FIG. 1, the system 100 includes the network 112. As mentioned above, in some instances, the network 112 enables communication between components of the system 100. In certain embodiments, the network 112 includes a suitable network and may communicate using any communication platforms and technologies suitable for transporting data and/or communication signals, examples of which are described with reference to FIG. 13. Furthermore, although FIG. 1 illustrates the server device(s) 106 and the client device 108 communicating via the network 112, in certain embodiments, the various components of the system 100 communicate and/or interact via other methods (e.g., the server device(s) 106 and the client device 108 communicate directly).

Figure 2A:
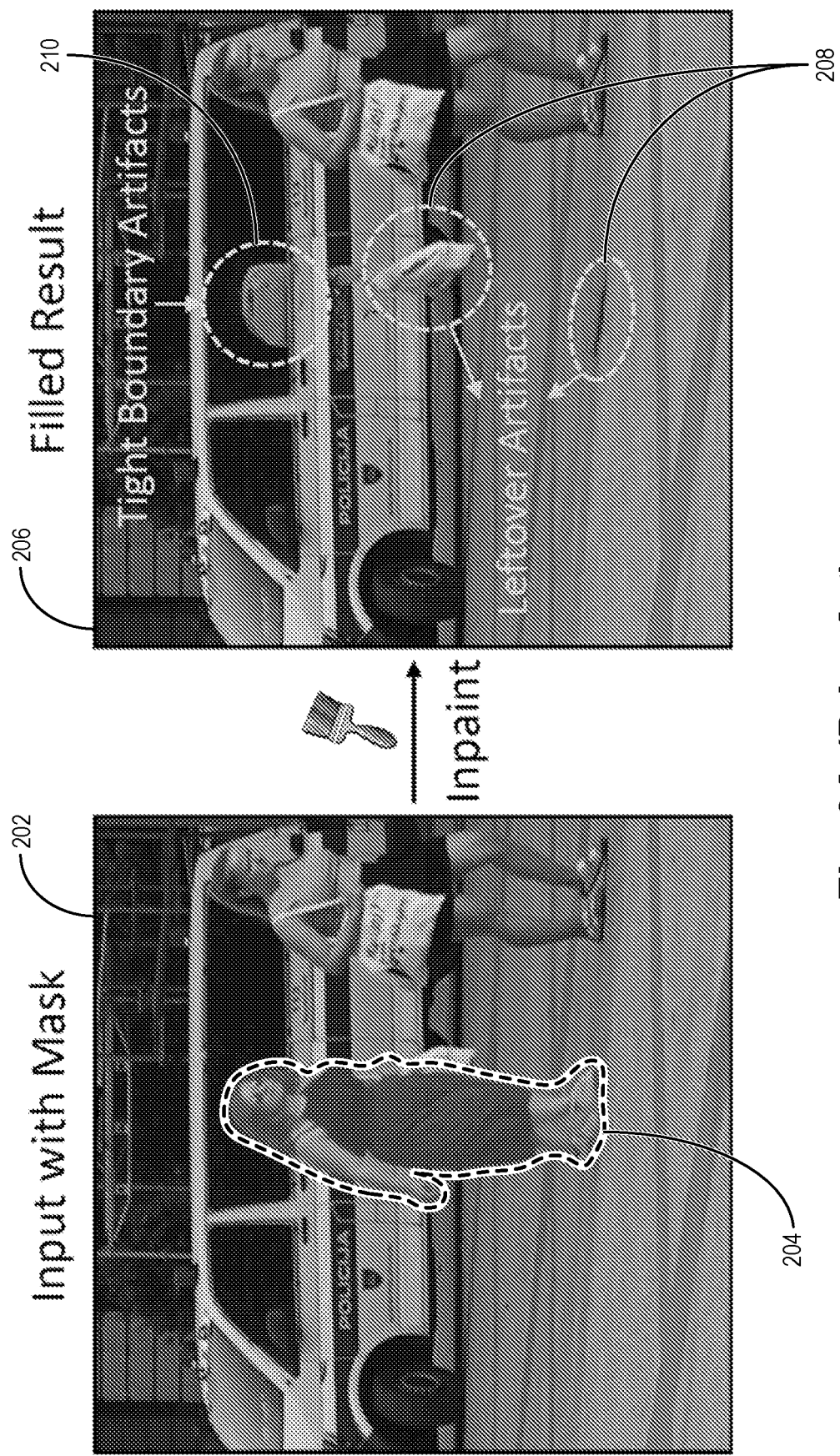
Figure 2B:
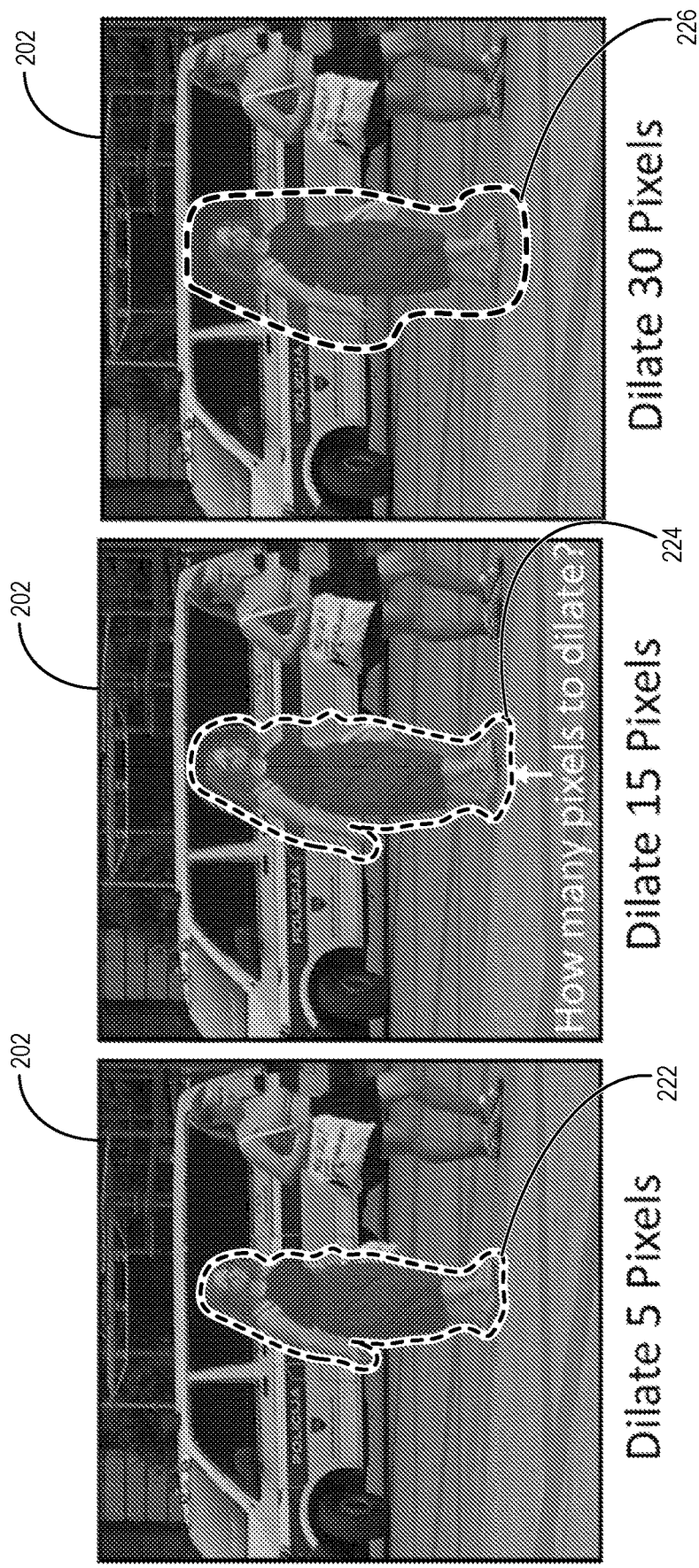

FIGS. 2A-2C illustrate some drawbacks of conventional inpainting systems. For example, FIG. 2A illustrates that conventional inpainting systems are sensitive to real-world cases in which an input image has an input mask that imperfectly covers a foreground object to be removed from the image, and in which predicted background is to be inpainted in place of the removed foreground object.

For example, FIG. 2A illustrates a digital image 202. A digital image includes a digital item capable of producing a visual representation. In particular, a digital image includes a digital photograph, a frame of a digital video, or any other digitally created image. In some embodiments, a digital image includes a frame of a digital camera feed or other digital video feed. Further, in some instances, a digital image includes a previously captured digital image (e.g., a previously captured photograph or a frame of a previously captured digital video).

A digital image depicts one or more objects. In some cases, an object includes a distinguishable element depicted in the digital image. For example, an object includes a person, an item, a natural object (e.g., a tree or a rock formation), or a structure depicted in the digital image. In some instances, an object includes a plurality of elements that, collectively, can be distinguished from other elements depicted in the digital image. For example, an object includes a collection of buildings that make up a skyline. In some instances, an object more broadly includes a foreground or other element(s) depicted in the digital image as distinguished from a background. In some cases, an object includes a foreground object to be removed from a digital image and inpainted with a replacement background. In some cases, an object includes a background object to be removed (the background object being background relative to a foreground subject or foreground object) and inpainted with a replacement background.

A mask includes an indication of pixels to be removed from a digital image. For instance, a mask includes a boundary of pixels, with pixels inside the boundary having a value of one, indicating that pixels inside should be retained, and with pixels outside the boundary having a value of zero, indicating that pixels outside should be removed.

Specifically, FIG. 2A illustrates the input image 202 and an input mask 204 for an object depicted in the input image 202. FIG. 2A further illustrates an output image 206 generated by a conventional inpainting system. As shown in the output image 206, the conventional inpainting system retained leftover artifacts 208 from the input image 202 (e.g., a shadow and a portion of a handbag) in the output image 206. For example, the conventional inpainting system retained the portions of the shadow and the handbag that were outside of the input mask 204. Furthermore, the conventional inpainting system populated portions of the output image 206 with unrealistic pixels, including pixels similar to the shadow and handbag, in the inpainted portion of the output image 206 where the input mask 204 was located. These leftover artifacts 208 demonstrate the inaccuracy of conventional inpainting systems.

Additionally, the conventional inpainting system generated tight boundary artifacts 210 in the output image 206 (e.g., groups of implausible and/or unrealistic pixels generated to fill the gap left from removal of the object, influenced by pixels that were part of the foreground object). For example, as shown in the output image 206, the conventional inpainting system inpainted portions of the input image 202 to generate the output image 206, but added pixels that do not match the background of the input image 202. In the example of FIG. 2A, the tight boundary artifacts 210 are caused in part by hair pixels that were outside of the input mask 204, but nevertheless part of the foreground object that was imperfectly covered by the input mask 204.

To further illustrate, conventional inpainting systems are deficient because they are trained on digital images with artificial masks. For example, conventional inpainting systems are trained with random samples of different types of artificial masks, including free-form artificial masks and instance artificial masks. To illustrate, a training dataset for conventional inpainting systems includes digital images with free-form artificial masks (e.g., a lasso selection or a paintbrush swipe) and/or instance artificial masks (e.g., an outline of an object, such as a person or a man-made structure). However, these masks are artificial in that they are placed over the input images without specifically covering an actual object. The artificial masks are placed over the background of the images, and the actual background of the images (i.e., behind the artificial masks) is used as a ground truth for training the conventional inpainting systems. Conventional inpainting systems use pixels neighboring the artificial masks as input for inpainting the gaps resulting from removal of portions of the image behind the artificial masks. These neighboring pixels perfectly represent the boundary of the removed portions of the image because they naturally extend from those removed portions. In other words, the neighboring pixels do not depict portions of foreground objects, but rather depict continuations of the background. Thus, conventional inpainting systems are biased by the neighboring pixels that are perfect extensions of the background, which are unrealistic for real-world used cases of masking foreground objects and inpainting to predict background pixels. This bias causes conventional inpainting systems to be very sensitive to cases of actual foreground object removal, especially when masks are imperfect.

FIG. 2B illustrates that conventional inpainting systems suffer from uncertainty with how to rectify the drawback of sensitivity to imperfect masks (discussed above in connection with FIG. 2A). Specifically, FIG. 2B illustrates the input image 202 of FIG. 2A, with different masks that are dilated from the input mask 204 of FIG. 2A. For instance, FIG. 2B illustrates a dilated mask 222 that is uniformly dilated by 5 pixels beyond the input mask 204, a dilated mask 224 that is uniformly dilated by 15 pixels beyond the input mask 204, and a dilated mask 226 that is uniformly dilated by 30 pixels beyond the input mask 204. Drawbacks of uniformly dilating the input mask 204 include a trial-and-error process that requires many inputs (e.g., user-device selections, clicks, text input, etc.). Additionally, this process does not readily yield an optimal result. For example, conventional inpainting systems do not give an indication which of the dilated mask 222, the dilated mask 224, or the dilated mask 226 is best for inpainting the input image 202. A dilated mask includes a mask that has been expanded by a certain number of pixels. For example, a dilated mask includes a uniformly dilated mask, which is a mask with a boundary that originated from an initial mask, but has been expanded a certain number of pixels on all sides of the boundary.

FIG. 2C illustrates that conventional inpainting systems produce inaccurate results when a dilated mask is used for inpainting. For instance, FIG. 2C illustrates an output image 240 generated by a conventional inpainting system using the dilated mask 226 of FIG. 2B (uniformly dilated by 30 pixels from the input mask 204 of FIG. 2A). While the output image 240 does not have the same leftover artifacts and tight boundary artifacts shown in output image 206 of FIG. 2A, it does suffer from errant removal of part of the background of input image 202. Specifically, the conventional inpainting system erroneously removed a vehicle handlebar and replaced it with background pixels 242 that omit the handlebar. Thus, by expanding the input mask 204 to the extent of the dilated mask 226, the conventional inpainting system removed portions of the input image 202 that should not have been removed.

Figure 2D:
FIG. 2D illustrates an example output of a mask-robust image inpainting system in accordance with one or more embodiments.

In contrast, FIG. 2D illustrates that the mask-robust image inpainting system 102 does not suffer from the deficiencies of conventional inpainting systems described above with reference to FIGS. 2A-2C. For instance, FIG. 2D illustrates example inputs and outputs of the mask-robust image inpainting system 102 in accordance with one or more embodiments. Specifically, FIG. 2D illustrates an input digital image 262 and an input initial mask 264. An initial mask includes a mask given as input for an inpainting process. For example, an initial mask includes a rough outline of an object, presuming that the inpainting process can and will likely adapt the mask in one or more of a variety of ways. In some cases, an initial mask includes a mask generated by the mask-robust image inpainting system 102 prior to inpainting.

As shown in FIG. 2D, the input initial mask 264 partially covers a foreground object to be removed from the digital image, but leaves a portion 266 of the foreground object uncovered. Thus, the input initial mask 264 is an imperfect mask. Notwithstanding the input initial mask 264 being an imperfect mask for the foreground object, the mask-robust image inpainting system 102 successfully and accurately generates an output modified digital image 268. A modified digital image (or modified image) includes an image generated by the mask-robust image inpainting system 102. For instance, a modified image includes an image generated by compositing an inpainted digital image and an input digital image. Compositing includes combining two or more images into a single image. For instance, compositing includes joining portions of an image with portions of another image based on indications in a mask of which portions should come from which images. An inpainted digital image (or inpainted image) includes an image comprising inpainted pixels. For instance, an inpainted image comprises modified pixels that predict a likely background scene for the portion of the image behind a removed object. An inpainted image can include modified pixels inside an initial mask and modified pixels outside the initial mask.

To illustrate, the mask-robust image inpainting system 102 removes the foreground object and inpaints the digital image with replacement background pixels, as shown in the output modified digital image 268. The mask-robust image inpainting system 102 utilizes some or all of the inpainting techniques described in further detail below to generate the output modified digital image 268.

Figure 3A:
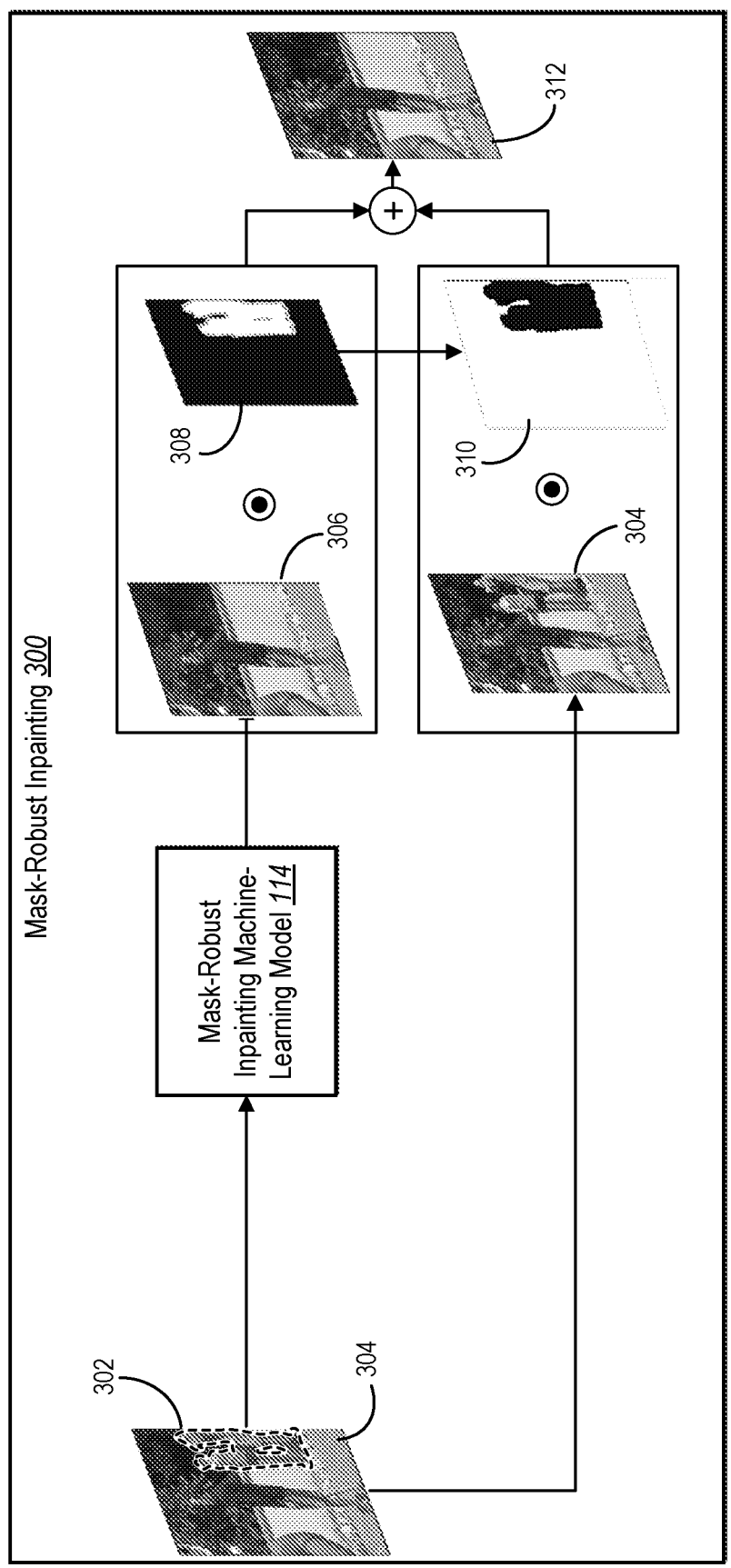
FIGS. 3A-3B illustrate processes for inpainting a digital image in accordance with some embodiments.

As discussed above, in some embodiments, the mask-robust image inpainting system 102 accurately inpaints digital images notwithstanding imperfect masks for objects in the digital images. For instance, FIG. 3A illustrates the mask-robust image inpainting system 102 performing mask-robust inpainting 300 in accordance with one or more embodiments. Specifically, as described in further detail below, FIG. 3A shows the mask-robust image inpainting system 102 obtaining an initial mask 302 for an object depicted in a digital image 304, generating an inpainted digital image 306 from the digital image 304 and the initial mask 302, generating a relaxed mask 308 that expands the initial mask 302, and generating a modified digital image 312 by compositing the inpainted digital image 306 and the digital image 304 utilizing the relaxed mask 308.

To illustrate, FIG. 3A depicts the mask-robust image inpainting system 102 obtaining an initial mask 302 for an object depicted in a digital image 304. For example, in some embodiments, the mask-robust image inpainting system 102 receives a preexisting digital image 304 and a predetermined initial mask 302. In some cases, the mask-robust image inpainting system 102 receives the initial mask 302 from another system (e.g., from an object segmentation system that predicts the initial mask 302). In some cases, the mask-robust image inpainting system 102 generates the initial mask 302 based on the digital image 304, as described with additional detail below. As illustrated in FIG. 3A, the initial mask 302 is imperfect. For example, as described above, the initial mask 302 does not completely cover the object and/or an effect of the object, such as the object's shadow. Nevertheless, the mask-robust image inpainting system 102 can accurately inpaint the digital image 304 (e.g., by generating the modified digital image 312), by removing the object, including its portions and shadow outside the initial mask 302, and by generating replacement background pixels for the removed object.

For instance, FIG. 3A illustrates the mask-robust image inpainting system 102 generating an inpainted digital image 306 from the digital image 304 and the initial mask 302. Specifically, the mask-robust image inpainting system 102 utilizes the mask-robust inpainting machine-learning model 114 to process the digital image 304 and the initial mask 302 to generate the inpainted digital image 306. In some embodiments, the mask-robust image inpainting system 102 utilizes the mask-robust inpainting machine-learning model 114 after it has been trained to generate inpainted digital images. In some embodiments, as described further below in connection with FIG. 4, the mask-robust image inpainting system 102 trains the mask-robust inpainting machine-learning model 114 to generate inpainted digital images.

As noted, in some implementations, the mask-robust image inpainting system 102 generates the inpainted digital image 306 by modifying pixels of the digital image 304 both inside the initial mask 302 and outside the initial mask 302. For instance, the mask-robust image inpainting system 102 utilizes the mask-robust inpainting machine-learning model 114 to generate modified pixels of the digital image 304 both inside the initial mask 302 and outside the initial mask 302.

As mentioned above and described below, in some embodiments, the mask-robust image inpainting system 102 trains the mask-robust inpainting machine-learning model 114 utilizing real-world datasets of images with imperfect masks for objects in the images. Thus, in some cases, the mask-robust image inpainting system 102, utilizing the mask-robust inpainting machine-learning model 114, is able to accurately predict replacement background pixels for the digital image 304, including replacement background pixels outside of the initial mask 302.

The mask-robust image inpainting system 102 can utilize a variety of algorithms and architectures to generate the inpainted digital image 306. For example, in some embodiments, the mask-robust image inpainting system 102 generates inpainted digital images utilizing a generative-adversarial-network-based ("GAN-based") inpainting model. For instance, the mask-robust image inpainting system 102 uses a generative adversarial neural network to inpaint pixels of the digital image 304. To elaborate, the mask-robust image inpainting system 102 utilizes a GAN-based inpainting model to replace foreground object pixels with replacement background pixels (e.g., to remove the foreground object from the image).

In some cases, the mask-robust image inpainting system 102 generates or trains a GAN-based inpainting model for the task of inpainting digital images. Indeed, a generative adversarial network ("GAN") refers to a network that is tuned or trained via an adversarial process to generate an output digital image from an input such as a noise vector. For example, a generative adversarial network includes multiple constituent neural networks such as one or more encoder neural networks and one or more generator (or decoder) neural networks. For example, an encoder neural network extracts latent code from a noise vector or from a digital image (e.g., a digital image depicting background and a foreground object). A generator neural network (or a combination of generator neural networks) generates an inpainted digital image (e.g., a digital image with some or all foreground object pixels removed or inpainted) by combining or otherwise processing extracted latent code (e.g., from the encoder neural network(s)). During training, a discriminator neural network, in competition with the generator neural network, analyzes a generated digital image to generate a realism prediction by determining whether the generated digital image is real (e.g., from a set of stored digital images) or fake (e.g., not from the set of stored digital images). Using one or more loss functions, the discriminator neural network also informs modification of parameters of encoder neural network(s), generator neural network(s), and/or the discriminator neural network to eventually generate digital images that fool the discriminator neural network into indicating that a generated digital image is a real digital image.

For example, in some implementations, the mask-robust image inpainting system 102 generates inpainted digital images utilizing one or more techniques described in GENERATING ITERATIVE INPAINTING DIGITAL IMAGES VIA NEURAL NETWORK BASED PERCEPTUAL ARTIFACT SEGMENTATIONS, U.S. patent application Ser. No. 17/815,418, filed on Jul. 27, 2022, the contents of which are incorporated by reference herein in their entirety.

Moreover, in some embodiments, the mask-robust image inpainting system 102 generates inpainted digital images utilizing a diffusion-based inpainting model. For example, the mask-robust image inpainting system 102 uses a diffusion-based inpainting model to inpaint pixels of the digital image 304. To elaborate, the mask-robust image inpainting system 102 utilizes a diffusion neural network to inpaint or remove and replace foreground object pixels in a digital image.

In some cases, a diffusion neural network refers to a type of generative neural network that utilizes a process involving diffusion and denoising to generate a digital image (e.g., an inpainted digital image without a foreground object). For example, the mask-robust image inpainting system 102 provides a diffusion neural network with a digital image representation (e.g., the digital image 304), whereupon the diffusion neural network, through its diffusion layers, adds noise to the digital image representation to generate a noise map or inversion (e.g., a representation of the digital image with added noise). In addition, the mask-robust image inpainting system 102 utilizes the architecture of the diffusion neural network (e.g., a plurality of denoising layers that remove noise or recreate a digital image) to generate a digital image (e.g., the inpainted digital image 306 with the foreground object pixels removed) from the noise map/inversion. In some implementations, the diffusion neural network utilizes a conditioning mechanism to condition the denoising layers for adding edits or modifications in generating a digital image from the noise map/inversion. For example, a conditioning mechanism includes a computer-implemented model (e.g., a conditioning encoder that utilizes a neural network encoding architecture) that generates or utilizes feature representations of desired changes or edits that are utilized by denoising layers to generate an inpainted digital image. In some cases, a conditioning mechanism utilizes a conditioning encoder such as a vision-language machine learning model to generate an encoding that is utilized in denoising layers to generate an inpainted digital image. Thus, conditioning sometimes includes utilizing these feature representations (e.g., concatenating or combining feature representations with representations generated by the denoising layers) with the layers to generate an inpainted digital image. A diffusion neural network encompasses a variety of diffusion architectures, including a deterministic forward diffusion model or denoising diffusion implicit model.

As mentioned, the mask-robust image inpainting system 102 generates a relaxed mask 308 for the inpainted digital image 306. For example, FIG. 3A depicts the mask-robust image inpainting system 102 generating a relaxed mask 308 that expands or modifies the initial mask 302. A relaxed mask includes a mask that is expanded from an initial mask. For instance, a relaxed mask has at least a portion of a boundary that is stretched to cover more than the initial mask. In some cases, a relaxed mask includes masks that have an eroded (e.g., constricted, reduced) portion of the boundary. In some implementations, the mask-robust image inpainting system 102 generates the relaxed mask 308 by dilating the initial mask 302 by a number of pixels (e.g., by five pixels, by ten pixels, by thirty pixels, etc.). In some embodiments, the mask-robust image inpainting system 102 generates the relaxed mask 308 utilizing a mask refiner machine-learning model, as described in additional detail below in connection with FIG. 3B.

As mentioned, FIG. 3A illustrates the mask-robust image inpainting system 102 generating a modified digital image 312 by compositing the inpainted digital image 306 and the digital image 304 utilizing the relaxed mask 308. In some implementations, the mask-robust image inpainting system 102 generates a masked inpainted digital image utilizing the relaxed mask 308. For example, the mask-robust image inpainting system 102 multiplies pixel values of the inpainted digital image 306 with pixel values of the relaxed mask 308 to generate the masked inpainted digital image. To illustrate, for pixels corresponding to a value of one in the relaxed mask 308, the mask-robust image inpainting system 102 populates the pixels of the masked inpainted digital image with the values of the corresponding pixels from the inpainted digital image 306. Similarly, for pixels corresponding to a value of zero in the relaxed mask 308, the mask-robust image inpainting system 102 populates the pixels of the masked inpainted digital image with values of zero.

Moreover, in some embodiments, the mask-robust image inpainting system 102 generates a masked background image from the digital image 304 utilizing the relaxed mask 308. More specifically, in some embodiments, the mask-robust image inpainting system 102 generates a background mask 310 from the relaxed mask 308, and generates the masked background image from the digital image 304 utilizing the background mask 310. For example, the mask-robust image inpainting system 102 inverts the relaxed mask 308 to generate the background mask 310. To illustrate, for a pixel in the relaxed mask 308 comprising a value of one (e.g., a white pixel), the mask-robust image inpainting system 102 populates a corresponding pixel in the background mask 310 with a zero (e.g., a black pixel). Conversely, for a pixel in the relaxed mask 308 comprising a value of zero (e.g., a black pixel), the mask-robust image inpainting system 102 populates a corresponding pixel in the background mask 310 with a one (e.g., a white pixel). Then, utilizing the background mask 310, the mask-robust image inpainting system 102 generates the masked background image. To illustrate, the mask-robust image inpainting system 102 multiplies pixel values of the digital image 304 with pixel values of the background mask 310 to generate the masked background image. For example, for pixels corresponding to a value of one in the background mask 310, the mask-robust image inpainting system 102 populates the pixels of the masked background image with the values of the corresponding pixels from the digital image 304. Similarly, for pixels corresponding to a value of zero in the background mask 310, the mask-robust image inpainting system 102 populates the pixels of the masked background image with values of zero.

As mentioned, the mask-robust image inpainting system 102 can generate the modified digital image 312 by compositing the inpainted digital image 306 and the digital image 304 utilizing the relaxed mask 308. In some embodiments, the mask-robust image inpainting system 102 composites the inpainted digital image 306 and the digital image 304 by combining the masked inpainted digital image and the masked background image. For example, for pixels corresponding to pixels of the masked inpainted digital image having nonzero values, the mask-robust image inpainting system 102 populates the corresponding pixels of the modified digital image 312 with the nonzero values of the corresponding pixels from the masked inpainted digital image. Similarly, for pixels corresponding to pixels of the masked background image having nonzero values, the mask-robust image inpainting system 102 populates the corresponding pixels of the modified digital image 312 with the nonzero values of the corresponding pixels from the masked background image. In this way, the mask-robust image inpainting system 102 populates the modified digital image 312 with pixels from the inpainted digital image 306 that correspond to pixels in the relaxed mask 308 comprising a value of one, and with pixels from the digital image 304 (i.e., the input image) that correspond to pixels in the background mask 310 comprising a value of one.

In some embodiments, the mask-robust image inpainting system 102 generates the modified digital image 312 directly from the inpainted digital image 306 and the digital image 304 utilizing the relaxed mask 308. For example, in some embodiments, the mask-robust image inpainting system 102 does not generate a background mask, a masked inpainted digital image, and/or a masked background image. For instance, the mask-robust image inpainting system 102 populates the pixels of the modified digital image 312 with values of the corresponding pixels of the inpainted digital image 306 where the relaxed mask 308 has corresponding pixels with values of one, and the mask-robust image inpainting system 102 populates the pixels of the modified digital image 312 with values of the corresponding pixels of the digital image 304 where the relaxed mask 308 has corresponding pixels with values of zero.

The generation of the modified digital image 312 can be represented symbolically according to the following equation:

$$O=[f(I,M)\odot R(M)]\oplus[I\odot(1-R(M))]$$

where I is the input digital mask, M is the input initial mask, R is a mask relaxation operator, f is the operator of the mask-robust inpainting machine-learning model, and O is the output modified digital image.

Figure 3B:
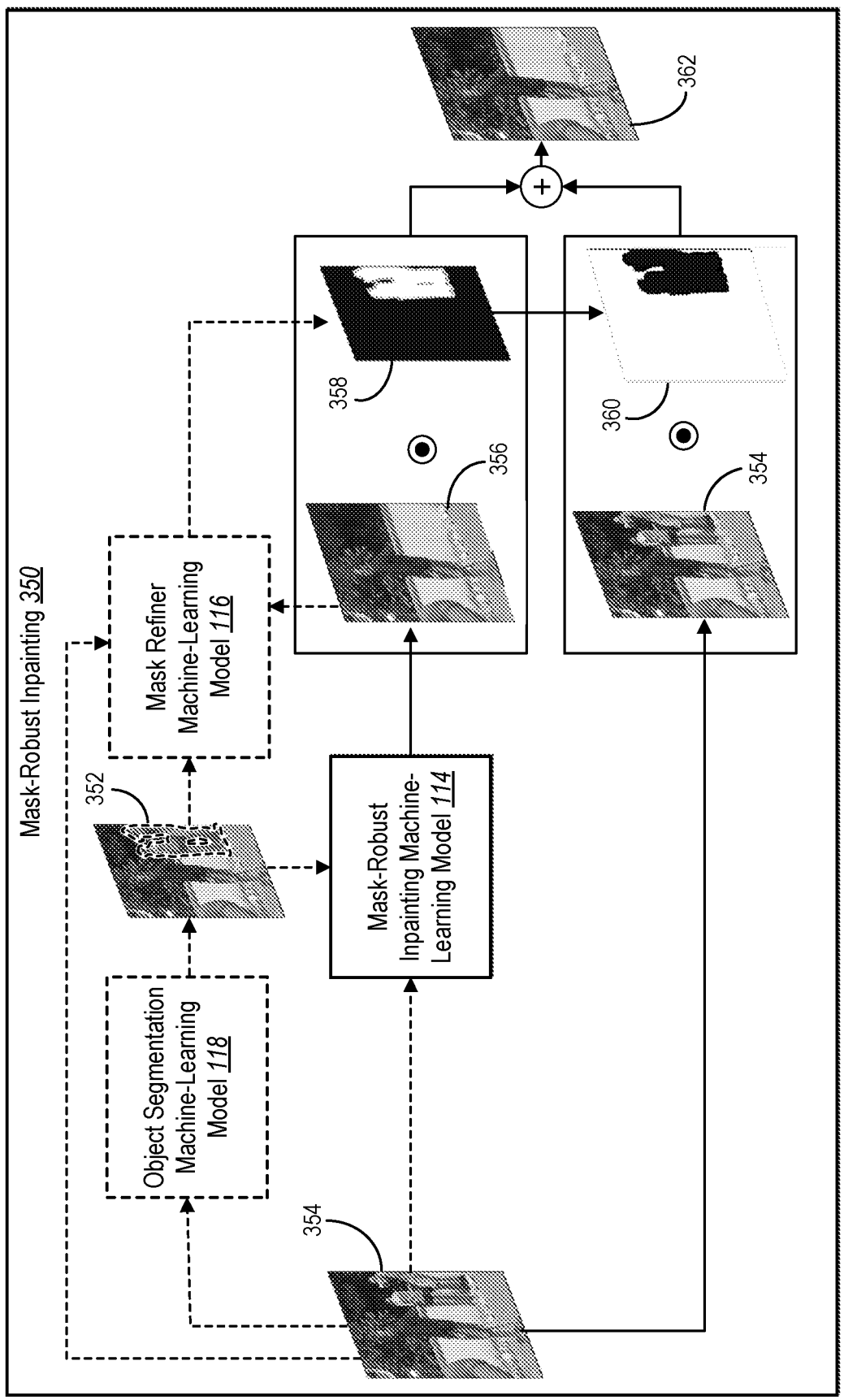

As described above, in some embodiments, the mask-robust image inpainting system 102 utilizes other models in addition to the mask-robust inpainting machine-learning model 114. For instance, FIG. 3B illustrates the mask-robust image inpainting system 102 performing mask-robust inpainting 350 in accordance with one or more embodiments. Specifically, FIG. 3B shows the mask-robust image inpainting system 102 optionally utilizing the object segmentation machine-learning model 118 to generate an initial mask 352 from a digital image 354. Further, FIG. 3B shows the mask-robust image inpainting system 102 optionally utilizing the mask refiner machine-learning model 116 to generate a relaxed mask 358 from the digital image 354 and an inpainted digital image 356.

To illustrate, in some embodiments, the mask-robust image inpainting system 102 obtains the initial mask by generating the initial mask 352 from the digital image 354 utilizing the object segmentation machine-learning model 118. For example, the mask-robust image inpainting system 102 obtains (e.g., receives, captures, etc.) the digital image 354 and identifies one or more objects depicted in the digital image 354 to remove and inpaint. For instance, the mask-robust image inpainting system 102 identifies the one or more objects to remove by receiving one or more indications (e.g., a click, a pen stroke, a cursor swipe, a bounding box, a lasso, and/or a text input identifying a semantic class) of one or more objects to remove from the digital image 354. The mask-robust image inpainting system 102 processes the digital image 354 and the indication of the one or more objects through the object segmentation machine-learning model 118 to generate the initial mask 352. The mask-robust image inpainting system 102 utilizes the object segmentation machine-learning model 118 to predict portions of the digital image 354 to be removed and replaced during inpainting (i.e., in the form of the initial mask 352).

However, in some cases, the initial mask 352 does not completely cover an object (or an effect of the object, such as a shadow) to be removed. Notwithstanding the initial mask 352 being imperfect in some instances, the mask-robust image inpainting system 102 can successfully and accurately inpaint the digital image 354 (i.e., generate the inpainted digital image 356), including portions of the digital image 354 that are outside the initial mask 352, but are part of the one or more objects to remove. Upon generation of the initial mask 352, the mask-robust image inpainting system 102 processes the initial mask 352 utilizing the mask-robust inpainting machine-learning model 114 to generate the inpainted digital image 356, similar to the description above of generating the inpainted digital image 306.

As mentioned, in some implementations, the mask-robust image inpainting system 102 utilizes the mask refiner machine-learning model 116 to generate the relaxed mask 358 from the digital image 354, the initial mask 352 (whether received from another system or generated utilizing the object segmentation machine-learning model 118), and the inpainted digital image 356. To illustrate, the mask-robust image inpainting system 102 processes the digital image 354, the initial mask 352, and the inpainted digital image 356 through the mask refiner machine-learning model 116 to generate the relaxed mask 358. For example, the mask-robust image inpainting system 102 generates the relaxed mask 358 by expanding portions of the boundary of the initial mask 352. In some cases, the mask-robust image inpainting system 102 expands portions of the boundary of the initial mask 352, while eroding other portions of the boundary of the initial mask 352 (e.g., for portions of the initial mask that are well beyond the object to be removed. The mask refiner machine-learning model 116 can learn to intelligently modify (e.g., expand) the initial mask 352 to encompass regions of the digital image that need to be inpainted. In some implementations, the mask-robust image inpainting system 102 trains the mask refiner machine-learning model 116, as described below in connection with FIG. 4.

In some embodiments of mask-robust inpainting 350 of FIG. 3B, the mask-robust image inpainting system 102 generates a background mask 360 similar to the background mask 310 described above in connection with mask-robust inpainting 300 of FIG. 3A. Relatedly, in some embodiments of mask-robust inpainting 350 of FIG. 3B, the mask-robust image inpainting system 102 generates a masked inpainted digital image similar to the masked inpainted digital image described above in connection with the mask-robust inpainting 300 of FIG. 3A. Likewise, in some embodiments of the mask-robust inpainting 350 of FIG. 3B, the mask-robust image inpainting system 102 generates a masked background image similar to the masked background image described above in connection with the mask-robust inpainting 300 of FIG. 3A. Similarly, in some embodiments of the mask-robust inpainting 350 of FIG. 3B, the mask-robust image inpainting system 102 generates a modified digital image 362 similar to the modified digital image 312 described above in connection with the mask-robust inpainting 300 of FIG. 3A.

Figure 4:
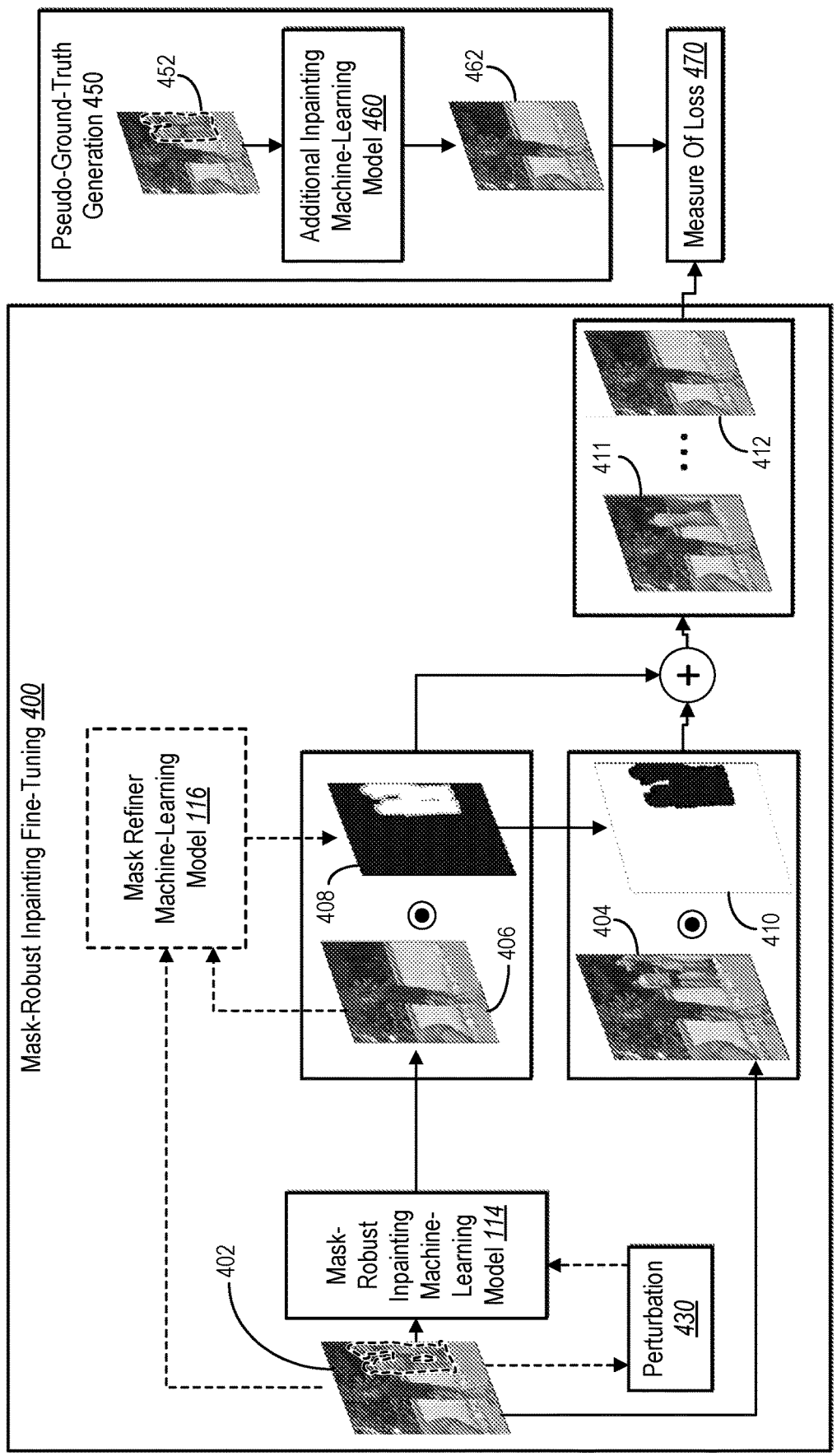
FIG. 4 illustrates processes for training a mask-robust inpainting machine-learning model in accordance with some embodiments.

As mentioned, in some embodiments, the mask-robust image inpainting system 102 trains one or more machine-learning models to perform the inpainting techniques described herein. For instance, FIG. 4 illustrates mask-robust inpainting fine-tuning 400, in which the mask-robust image inpainting system 102 trains the mask-robust inpainting machine-learning model 114 and (optionally) the mask refiner machine-learning model 116 in accordance with one or more embodiments. Specifically, FIG. 4 shows the mask-robust image inpainting system 102 training the mask-robust inpainting machine-learning model 114 by generating an inpainted image 406 from a digital image 404 and an initial mask 402, generating a pseudo-ground-truth inpainted image 462 from the digital image 404 utilizing a dilated mask 452 generated from the initial mask 402, determining a measure of loss 470 by comparing the inpainted image 406 (e.g., via a modified digital image 411 or a modified digital image 412 generated from the inpainted image 406) and the pseudo-ground-truth inpainted image 462, and tuning parameters of the mask-robust inpainting machine-learning model 114 based on the measure of loss 470.

To illustrate, in some implementations, the mask-robust image inpainting system 102 generates, utilizing the mask-robust inpainting machine-learning model 114, the inpainted image 406 from the digital image 404 in a fashion similar to the description above of generating the inpainted image 306 in connection with FIG. 3A, and/or similar to the description above of generating the inpainted image 356 in connection with FIG. 3B. For example, the mask-robust image inpainting system 102 generates the inpainted image 406 by modifying pixels of the digital image 404 that are inside the initial mask 402, as well as by modifying pixels of the digital image 404 that are outside the initial mask 402.

In particular, in some embodiments, the mask-robust image inpainting system 102 generates a relaxed mask 408 that expands the initial mask 402. To illustrate, the mask-robust image inpainting system 102 utilizes techniques (e.g., dilation or the processing through the mask refiner machine-learning model 116) similar to the description above of generating the relaxed mask 308 in connection with FIG. 3A, and/or the relaxed mask 358 in connection with FIG. 3B.

Additionally, in some embodiments, the mask-robust image inpainting system 102 generates a modified digital image 412 (or, as explained further below, a modified digital image 411) by compositing the inpainted image 406 and the digital image 404 utilizing the relaxed mask 408. To illustrate, the mask-robust image inpainting system 102 utilizes techniques similar to the description above of generating the modified digital image 312 in connection with FIG. 3A, and/or the modified digital image 362 in connection with FIG. 3B. For example, the mask-robust image inpainting system 102 (optionally) generates a background mask 410 (similar to the background mask 310 or the background mask 360), a masked inpainted digital image (as described above), and/or a masked background image (as described above).

As mentioned, in some implementations, the mask-robust image inpainting system 102 generates, utilizing an additional inpainting machine-learning model 460, a pseudo-ground-truth inpainted image 462 from the digital image 404 utilizing a dilated mask 452 generated from the initial mask 402. To illustrate, in some cases, the mask-robust image inpainting system 102 generates the dilated mask 452 by dilating the initial mask 402 to fully cover an object portrayed in the digital image 404 (wherein the object is to be removed and inpainted). For example, the mask-robust image inpainting system 102 sufficiently dilates the initial mask 402 by a large number of pixels to ensure that the object will be completely removed (i.e., to ensure that no portions of the object, or of an effect of the object such as a shadow, remain in the image). A pseudo-ground-truth inpainted image includes an inpainted image that represents a likely background (even though the actual background is unknown, e.g., due to an obstructing object in the original image). A pseudo-ground-truth inpainted image includes an inpainted image that is utilized as a ground truth during training of a machine-learning model.

To illustrate further, in some embodiments, the mask-robust image inpainting system 102 processes the digital image 404 and the dilated mask 452 through the additional inpainting machine-learning model 460 to generate the pseudo-ground-truth inpainted image 462. In some embodiments, the additional inpainting machine-learning model 460 is one of a variety of machine-learning models trained to inpaint one or more objects in a digital image with replacement background pixels. For example, the additional inpainting machine-learning model can be a GAN-based model, a diffusion-based model, or another model that can perform image inpainting, such as a model similar to the mask-robust inpainting machine-learning model 114 described herein.

With the pseudo-ground-truth inpainted image 462, the mask-robust image inpainting system 102 can train (e.g., tune) the mask-robust inpainting machine-learning model 114. To illustrate, the mask-robust image inpainting system 102 compares the inpainted image 406 and the pseudo-ground-truth inpainted image 462 to determining the measure of loss 470. For example, the mask-robust image inpainting system 102 compares the modified digital image 411 or the modified digital image 412 (which are generated based on the inpainted image 406) and the pseudo-ground-truth inpainted image 462 to determine the measure of loss 470. The measure of loss 470 is based on a loss function suitable for image inpainting. The mask-robust image inpainting system 102 considers the measure of loss 470 and tunes parameters of the mask-robust inpainting machine-learning model 114 based on the measure of loss 470 to reduce the measure of loss. A measure of loss includes a metric that represents how far an output of a machine-learning model is from a ground truth. For instance, a measure of loss includes a numerical indication of the accuracy of an inpainted image. The mask-robust image inpainting system 102 can utilize a variety of loss functions such as a mean square error loss function, a quadratic loss function, an L2 loss function, a mean absolute error/L1 loss function, a hinge loss/multi-class SVM loss function, or a cross entropy loss/negative log likelihood function.

To illustrate the iterative process of tuning the mask-robust inpainting machine-learning model 114, in some embodiments, the mask-robust image inpainting system 102 generates a first inpainted image (and, correspondingly, a first modified digital image 411) to determine a first measure of loss. The mask-robust image inpainting system 102 tunes the parameters of the mask-robust inpainting machine-learning model 114 accordingly. Subsequently, the mask-robust image inpainting system 102 generates a second inpainted image (and, correspondingly, a second modified digital image 412) to determine a second measure of loss. The mask-robust image inpainting system 102 further tunes the parameters of the mask-robust inpainting machine-learning model 114 based on the second measure of loss. Tuning includes adapting parameters of a machine-learning model with a goal of improving the performance of the machine-learning model. For example, tuning includes iteratively adjusting the parameters of the machine-learning model in a methodical way to march a series of machine-learning model outputs towards an optimum point, such as a minimum measure of loss.

In some embodiments, the mask-robust image inpainting system 102 generates multiple inpainted images (and, correspondingly, multiple modified digital images 411, 412, etc.) from a digital image 404 simultaneously. The mask-robust image inpainting system 102 determines multiple measures of loss 470 based on the multiple inpainted images and tunes the parameters of the mask-robust inpainting machine-learning model 114 based on an optimum measure of loss.

As mentioned, in some embodiments, the mask-robust image inpainting system 102 trains the mask refiner machine-learning model 116 (e.g., simultaneously with training of the mask-robust inpainting machine-learning model 114) by tuning parameters of the mask refiner machine-learning model 116 based on the measure of loss 470. For example, the mask-robust image inpainting system 102 generates the relaxed mask 408 utilizing the mask refiner machine-learning model 116. The mask-robust image inpainting system 102 iteratively generates modified digital images (e.g., modified digital image 411 and modified digital image 412) and determines respective measures of loss 470 by comparing, for each iteration, the modified digital image to the pseudo-ground-truth inpainted image 462. The mask-robust image inpainting system 102 tunes the parameters of the mask refiner machine-learning model 116 at each iteration based on the current (at that iteration) measure of loss 470. In some implementations, the mask-robust image inpainting system 102 utilizes the same measure of loss 470 to train the mask refiner machine-learning model 116 that it utilizes to train the mask-robust inpainting machine-learning model 114. In some embodiments, the mask-robust image inpainting system 102 utilizes a different measure of loss to train the mask refiner machine-learning model 116 then the measure of loss 470 that it utilizes to train the mask-robust inpainting machine-learning model 114.

As additionally illustrated in FIG. 4, the mask-robust image inpainting system 102 can implement perturbation 430 to fine tune the mask-robust inpainting machine-learning model 114 (and, optionally, the mask refiner machine-learning model 116). For instance, in some embodiments, the mask-robust image inpainting system 102 simulates real-world masking scenarios by eroding or otherwise perturbing the initial mask 402 in one or more of a number of ways. By perturbing the initial mask 402 during training, the mask-robust image inpainting system 102 generates additional objects masks that, for use as input the mask-robust inpainting machine-learning model 114, represent likely real-world masks that incompletely cover objects to be removed.

To illustrate, in some implementations, the mask-robust image inpainting system 102 generates a perturbed mask from the initial mask 402. The mask-robust image inpainting system 102 then processes the perturbed mask as input to the mask-robust inpainting machine-learning model 114 (e.g., by replacing the initial mask 402 with the perturbed mask) to generate the inpainted image 406. The mask-robust image inpainting system 102 generates a relaxed mask 408 that expands the perturbed mask. The mask-robust image inpainting system 102 proceeds in similar fashion as described above. In particular, the mask-robust image inpainting system 102 generates modified digital image 411 (or modified digital image 412) by compositing the inpainted image 406 and the digital image 404 utilizing the relaxed mask 408. To determine the measure of loss 470, the mask-robust image inpainting system 102 compares the inpainted image 406 and the pseudo-ground-truth inpainted image 462 by comparing the modified digital image 411 (or modified digital image 412) and the pseudo-ground-truth inpainted image 462.

The mask-robust image inpainting system 102 can utilizes a variety of perturbation methods. For instance, in some implementations, the mask-robust image inpainting system 102 generates the perturbed mask by replacing the initial mask 402 utilizing a free-form mask. For example, the mask-robust image inpainting system 102 randomly places another free-form mask (e.g., an instance mask) in place of the initial mask 402.

As another example, in some embodiments, the mask-robust image inpainting system 102 generates the perturbed mask by eroding a selection of boundary pixels of the initial mask 402. For instance, the mask-robust image inpainting system 102 randomly erodes an arbitrary amount of portions of the initial mask 402 around an edge of the initial mask 402.

As yet another example, in some cases, the mask-robust image inpainting system 102 generates the perturbed mask by identifying pixel regions within the initial mask 402, determining probabilities that the pixel regions cover the object portrayed in the digital image (i.e., the object to be removed by inpainting), and removing one or more of the pixel regions from the initial mask 402 based on the probabilities. For instance, the mask-robust image inpainting system 102 identifies superpixel regions (e.g., groups of multiple pixels, such as 10 pixels or 16 pixels) within the digital image 404 that touch the initial mask 402. The mask-robust image inpainting system 102 categorizes the superpixel regions based on whether they touch the boundary of the initial mask 402. For a subset of these boundary superpixel regions that cross the boundary (e.g., superpixel regions that contain pixels portraying the object and pixels portraying background), the mask-robust image inpainting system 102 identifies these superpixel regions as "hard" superpixel regions. The mask-robust image inpainting system 102 assigns probabilities (e.g., weights) to the superpixel regions, with the boundary superpixel regions and the "hard" superpixel regions being given higher probability values. The mask-robust image inpainting system 102 then randomly drops (e.g., omits, deletes) some of the superpixel regions from the initial mask 402 to generate the perturbed mask.

Additionally, in some embodiments, the mask-robust image inpainting system 102 generates the perturbed mask by utilizing an object selection model (such as the object segmentation machine-learning model 118) to generate a new segmentation for the object and replace the initial mask 402 with the new segmentation. This has the advantage of directly simulating mask inputs generated by automatic object selection models, which are frequent inputs to inpainting models, such as the mask-robust inpainting machine-learning model 114.

The training of the mask-robust inpainting machine-learning model 114 can be represented symbolically according to the following equations:

$$O = [f(I, M) \odot R(M)] \oplus [I \odot (1 - R(M))]$$

$$\mathcal{L}_{inpaint}(f) = \ell(O, g(I, SD(M)))$$

$$R(M) = M + h(I, M, f(I, M))$$

where I is the input digital mask, M is the input initial mask, R is a mask relaxation operator, f is the operator of the mask-robust inpainting machine-learning model, O is the output modified digital image, SD is a sufficient dilation operator, g is a pseudo-ground-truth generator (e.g., a pretrained inpainting model), l is a loss function for inpainting, $L_{inpaint}$ is an optimization objective function, and h is the operator of the mask refiner machine-learning model. For cases in which the training of the mask-robust inpainting machine-learning model 114 occurs simultaneously with training of the mask refiner machine-learning model 116, the optimization objective can be represented as:

$$\mathcal{L}_{inpaint}(f, h) = \ell(O, g(I, SD(M)))$$

For cases in which the mask-robust image inpainting system 102 utilizes perturbation 430, the output modified digital image can be represented symbolically as:

$$O = [f(I, M) \odot R(\phi(M))] \oplus [I \odot (1 - R(\phi(M)))]$$

where $\phi$ is the mask perturbation operation.

Figure 5:
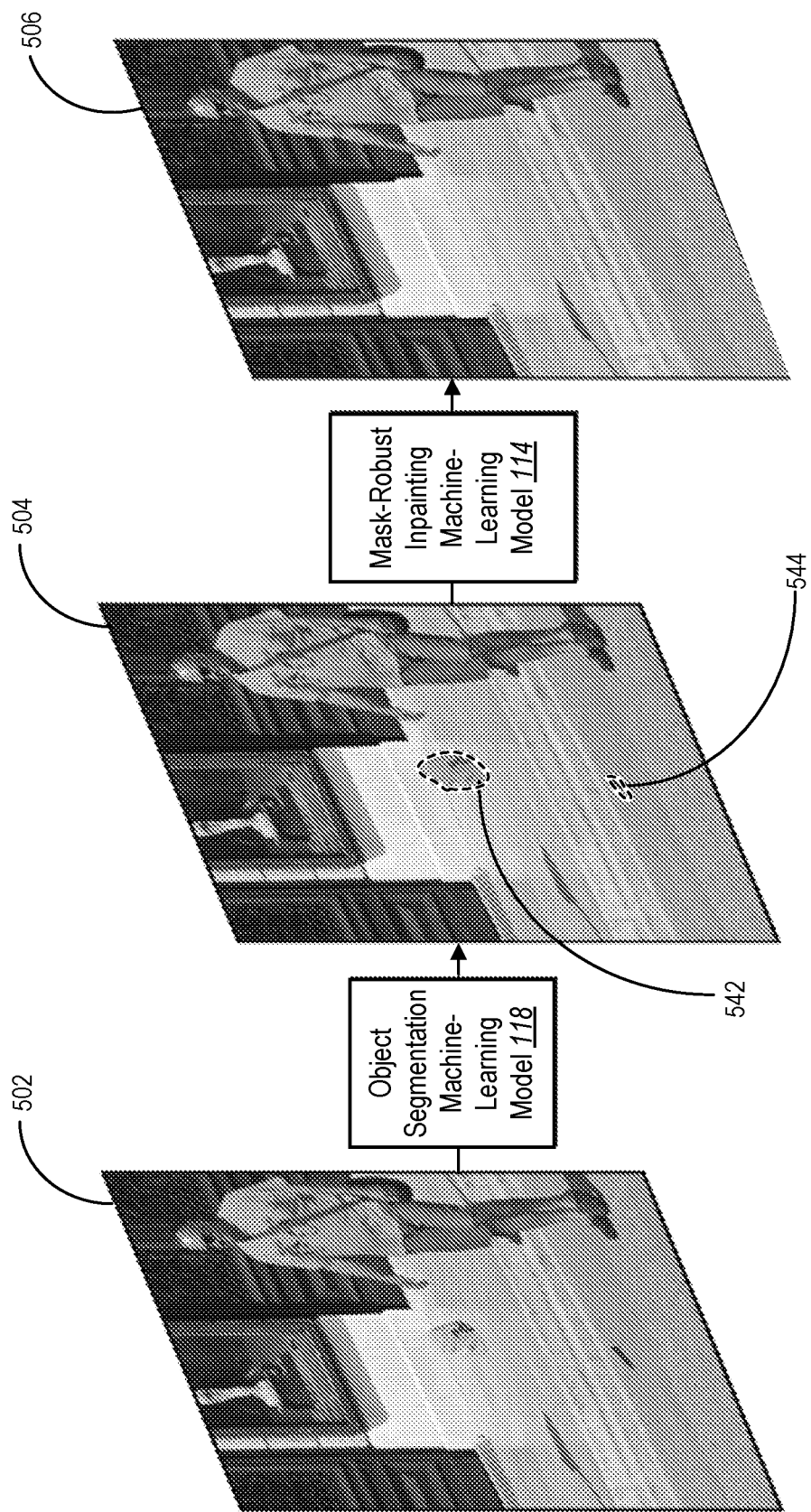
FIG. 5 illustrates an artifact detection and removal process in accordance with one or more embodiments.

As mentioned above, in some embodiments, the mask-robust image inpainting system 102 detects and removes artifacts leftover after an inpainting process. For instance, FIG. 5 illustrates the mask-robust image inpainting system 102 performing artifact detection and removal in accordance with one or more embodiments. Specifically, FIG. 5 shows the mask-robust image inpainting system 102 obtaining a digital image 502, detecting artifacts in the digital image 502, processing the digital image 502 through the object segmentation machine-learning model 118 to generate a masked image 504 with masks 542 and 544 for the artifacts (e.g., a portion of a removed object and a shadow), and processing the masked image 504 through the mask-robust inpainting machine-learning model 114 to generate a refined digital image 506.

To further illustrate, in some embodiments, after the mask-robust image inpainting system 102 generates a modified digital image from an inpainting process (e.g., the modified digital image 312), the mask-robust image inpainting system 102 detects an artifact in the modified digital image. The mask-robust image inpainting system 102 then generates, utilizing the mask-robust inpainting machine-learning model 114, a refined inpainted digital image from the modified digital image. The mask-robust image inpainting system 102 then generates a refined digital image by compositing the refined inpainted digital image and the modified digital image, utilizing techniques similar to those described above in connection with FIGS. 3A and 3B.

In some implementations, the mask-robust image inpainting system 102 utilizes the object segmentation machine-learning model 118 to generate an artifact mask (e.g., masks 542 and 544) for the artifact(s) detected. Consequently, the mask-robust image inpainting system 102 generates the refined digital image 506 by generating, utilizing the mask-robust inpainting machine-learning model 114, refined pixels inside the artifact mask and outside the artifact mask.

The mask-robust image inpainting system 102 can utilize a variety of methods to detect and remove artifacts. For example, in some implementations, the mask-robust image inpainting system 102 detects and removes artifacts utilizing one or more techniques described in GENERATING NEURAL NETWORK BASED PERCEPTUAL ARTIFACT SEGMENTATIONS IN MODIFIED PORTIONS OF A DIGITAL IMAGE, U.S. patent application Ser. No. 17/815, 409, filed on Jul. 27, 2022, the contents of which are incorporated by reference herein in their entirety.

As discussed above, in some embodiments, the mask-robust image inpainting system 102 successfully and accurately inpaints digital images utilizing imperfect masks of objects to be removed from the digital images. For instance, FIGS. 6-9 illustrate input digital images and output modified digital images of the mask-robust image inpainting system 102 in accordance with one or more embodiments.

Figure 6:
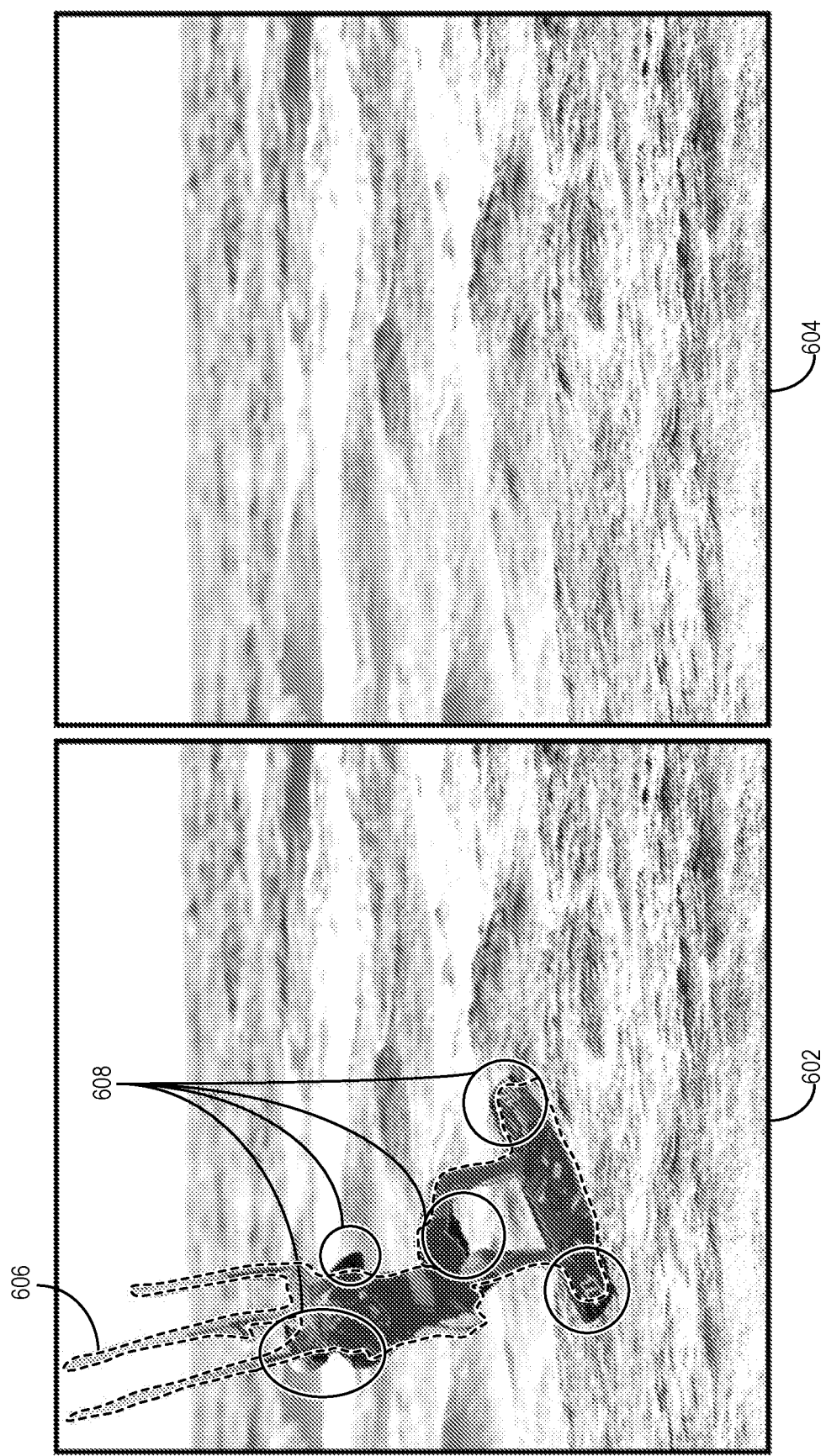
FIGS. 6-9 illustrate example outputs of a mask-robust image inpainting system in accordance with some embodiments.

Specifically, FIG. 6 shows an input digital image 602 depicting a kitesurfer over the ocean in the background. The kitesurfer, along with kitesurfing equipment, is masked by an initial mask 606. The initial mask 606 was generated using a digital brush (e.g., by swiping a cursor over portions of the kitesurfer). However, the initial mask 606 is imperfect, having several gaps 608 as demonstrated by ovals in FIG. 6. For instance, portions of the kitesurfer, such as a helmet, an elbow, and a swimsuit, and portions of the kiteboard, are not covered by the initial mask 606. Notwithstanding these imperfections in the initial mask 606, the mask-robust image inpainting system 102 generated the modified digital image 604, which realistically depicts the ocean, including in portions of the image where the kitesurfer was depicted in the input digital image 602.

Figure 7:
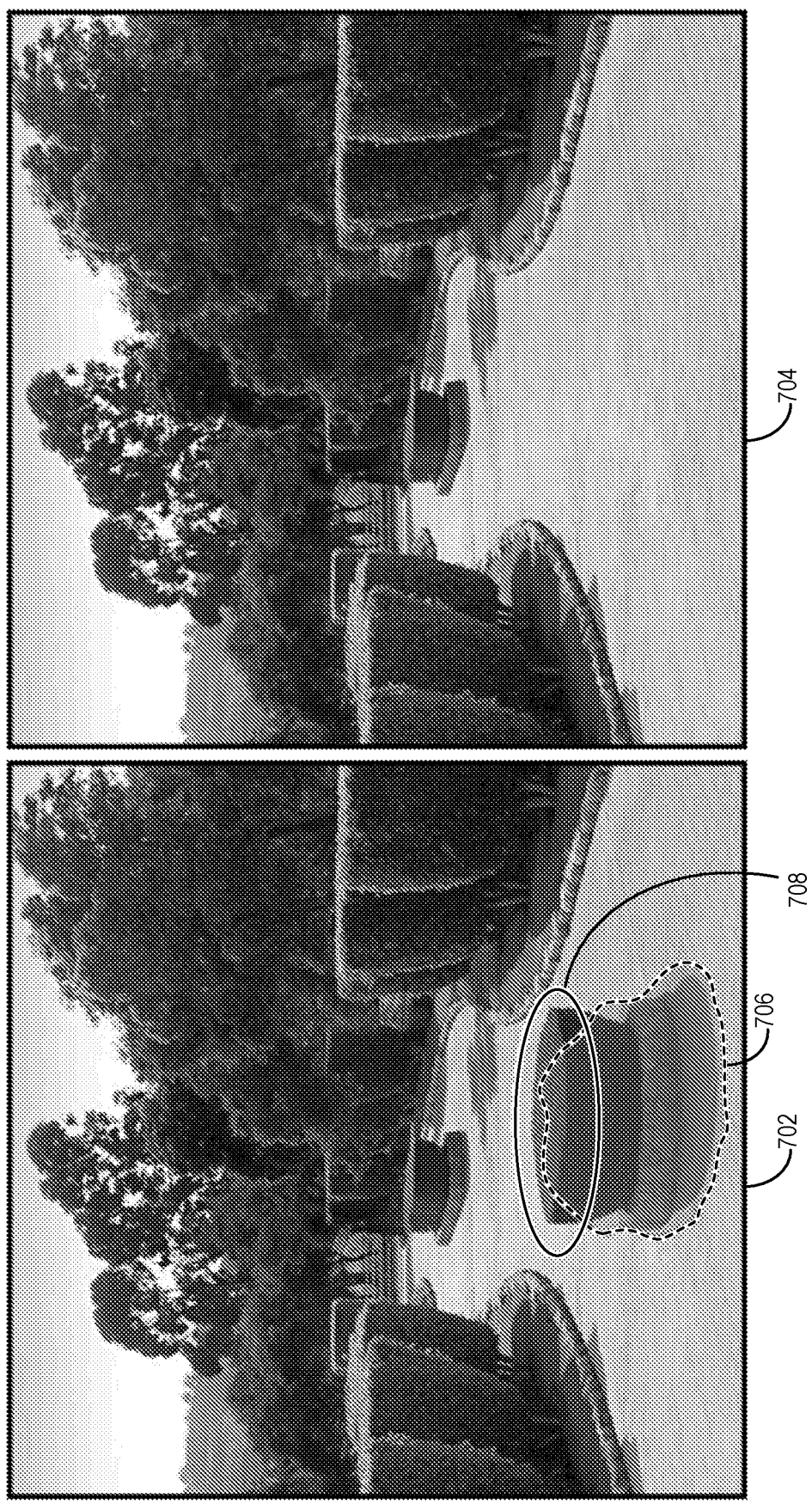

Similarly, FIG. 7 shows an input digital image 702 depicting a park garden area. A shrub in the garden is masked by an initial mask 706. The initial mask 706 was generated using a lasso select tool (e.g., by circling a cursor around portions of the shrub). However, the initial mask 706 is imperfect, having a large gap 708 as demonstrated by an oval in FIG. 7. For instance, a substantial portion of the top of the shrub is not covered by the initial mask 706. Notwithstanding these imperfections with the initial mask 706, the mask-robust image inpainting system 102 generated the modified digital image 704, which realistically depicts the park garden area without the removed shrub.

Figure 8:
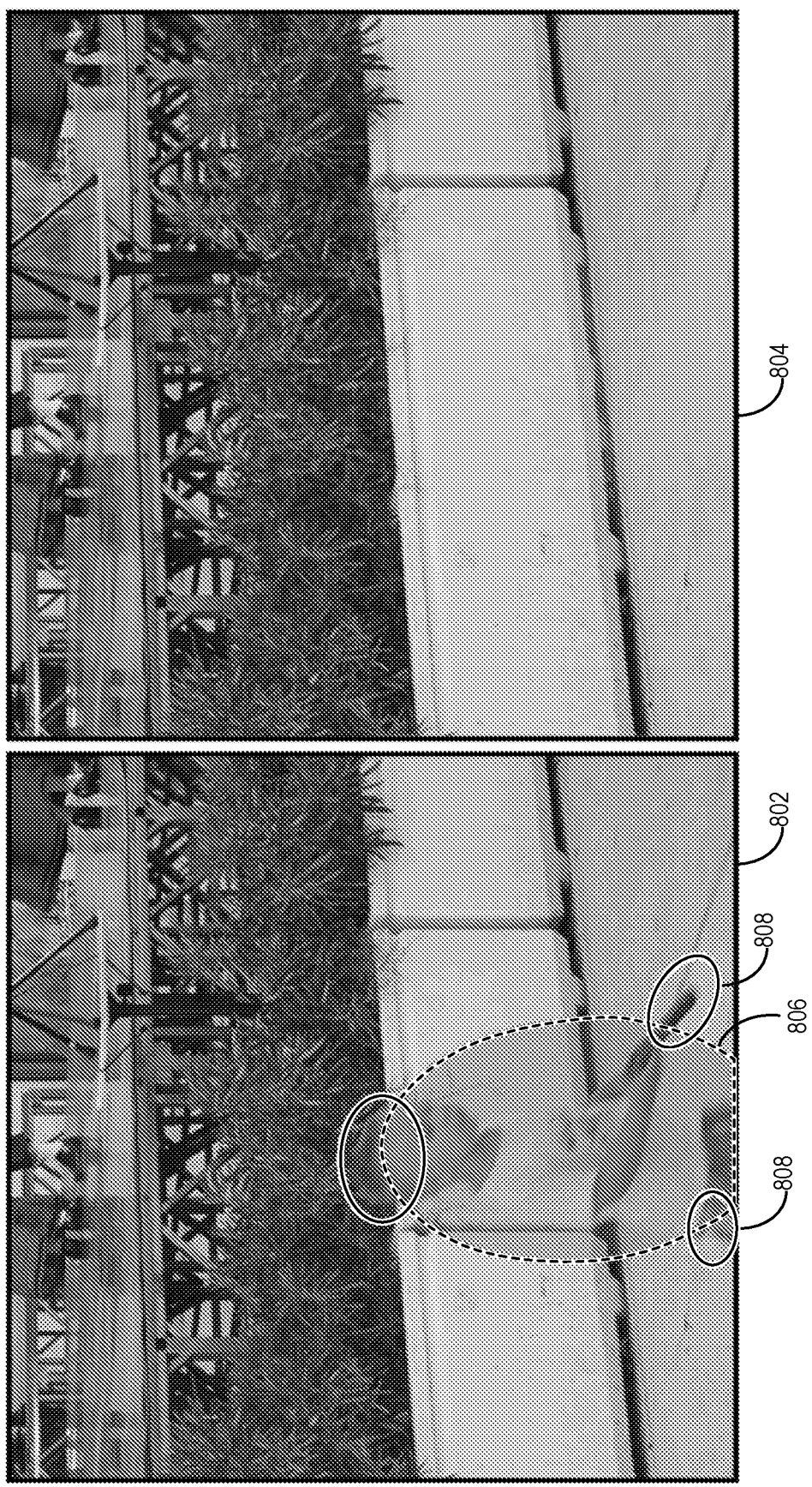

As another example, FIG. 8 shows an input digital image 802 depicting a person holding an object in front of a scene. The person and object are masked by an initial mask 806. The initial mask 806 was generated using a quick circle selection (e.g., by clicking and dragging a cursor). However, the initial mask 806 is imperfect, having gaps 808 as demonstrated by ovals in FIG. 8. For instance, a portion of the person's head, a portion of the object, and a portion of the person's clothing are not covered by the initial mask 806. Notwithstanding these imperfections with the initial mask 806, the mask-robust image inpainting system 102 generated the modified digital image 804, which realistically depicts the scene without the person.

Figure 9:
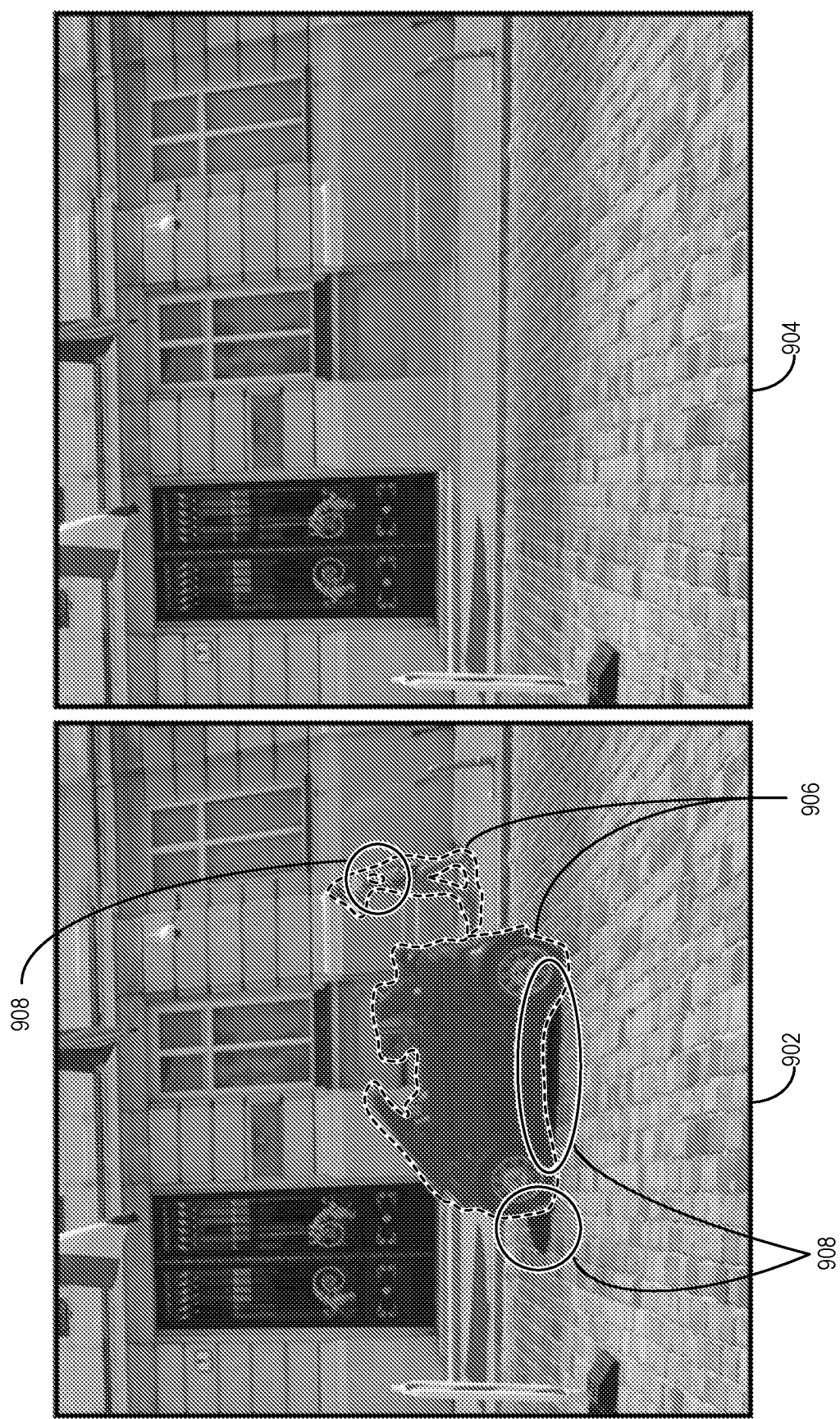

Additionally, FIG. 9 shows an input digital image 902 depicting a vehicle and a person on a city street in front of a building. The vehicle and person are masked by initial masks 906. The initial masks 906 were generated using a deep segmentation object selection model. However, the initial masks 906 are imperfect, having gaps 908 as demonstrated by ovals in FIG. 9. For instance, a shadow of the vehicle and portion of the person are not covered by the initial masks 906. Notwithstanding these imperfections with the initial masks 906, the mask-robust image inpainting system 102 generated the modified digital image 904, which realistically depicts the city street and the building façade without the vehicle or the person.

Figure 10:
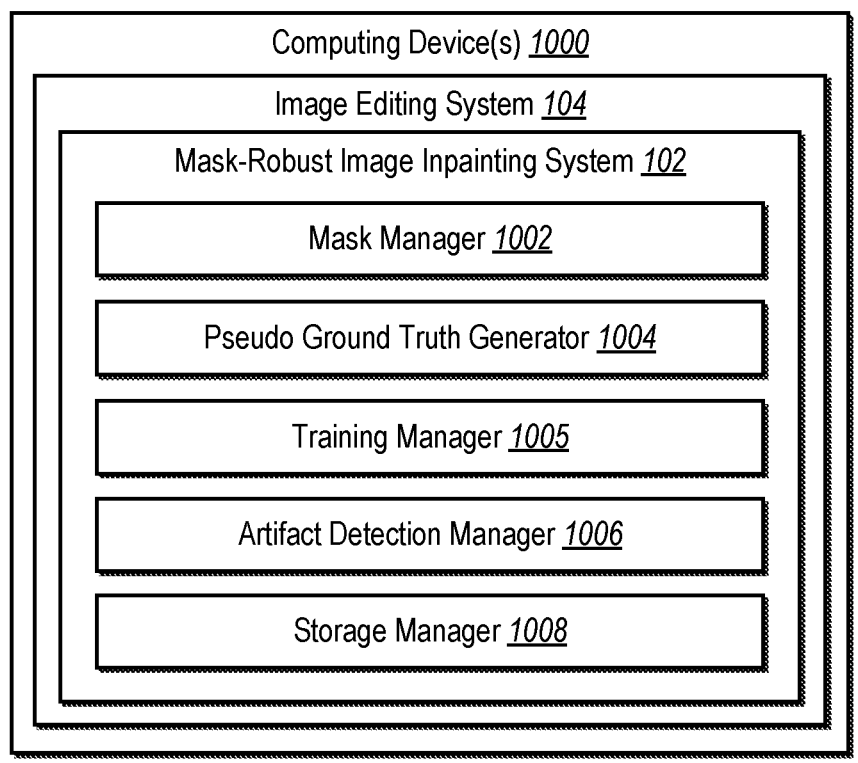
FIG. 10 illustrates a schematic diagram of an example architecture of a mask-robust image inpainting system in accordance with one or more embodiments.

Turning now to FIG. 10, additional detail will be provided regarding components and capabilities of one or more embodiments of the mask-robust image inpainting system 102. In particular, FIG. 10 illustrates an example mask-robust image inpainting system 102 executed by a computing device(s) 1000 (e.g., the server device(s) 106 or the client device 108). As shown by the embodiment of FIG. 10, the computing device(s) 1000 includes or hosts the image editing system 104 and/or the mask-robust image inpainting system 102. Furthermore, as shown in FIG. 10, the mask-robust image inpainting system 102 includes a mask manager 1002, a pseudo ground truth generator 1004, a training manager 1005, an artifact detection manager 1006, and a storage manager 1008.

As shown in FIG. 10, the mask-robust image inpainting system 102 includes a mask manager 1002. The mask manager 1002 can generate, create, and/or modify a mask. For instance, as described above, the mask manager 1002 can generate an initial mask, a relaxed mask, and/or a perturbed mask. Furthermore, the mask manager 1002 can generate inpainted images and composite the inpainted images with input images to generate modified images.

Moreover, as shown in FIG. 10, the mask-robust image inpainting system 102 includes a pseudo ground truth generator 1004. The pseudo ground truth generator 1004 can generate pseudo-ground-truth inpainted images from input images and input masks.

In addition, as illustrated in FIG. 10, the mask-robust image inpainting system 102 also includes a training manager 1005. The training manager 1005 can train one or more machine learning models, as described above, including a mask-robust inpainting machine-learning model, a mask refiner machine-learning model, or an artifact detection model.

Furthermore, as shown in FIG. 10, the mask-robust image inpainting system 102 includes an artifact detection manager 1006. The artifact detection manager 1006 can detect leftover artifacts in a modified digital image and remove the leftover artifacts by inpainting them.

In addition, as shown in FIG. 10, the mask-robust image inpainting system 102 also includes a storage manager 1008. The storage manager 1008 can store information (e.g., via one or more memory devices) for the mask-robust image inpainting system 102. For example, in one or more embodiments, the storage manager 1008 includes digital images, modified digital images, pseudo ground truth digital images, a mask-robust inpainting machine-learning model, a mask refiner machine-learning model, and/or an artifact detection model.

Each of the components 1002-1008 of the mask-robust image inpainting system 102 can include software, hardware, or both. For example, the components 1002-1008 can include one or more instructions stored on a computer-readable storage medium and executable by processors of one or more computing devices, such as a client device or server device. When executed by the one or more processors, the computer-executable instructions of the mask-robust image inpainting system 102 can cause the computing device(s) to perform the methods described herein. Alternatively, the components 1002-1008 can include hardware, such as a special purpose processing device to perform a certain function or group of functions. Alternatively, the components 1002-1008 of the mask-robust image inpainting system 102 can include a combination of computer-executable instructions and hardware.

Furthermore, the components 1002-1008 of the mask-robust image inpainting system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1008 may be implemented as a stand-alone application, such as a desktop or mobile application. Furthermore, the components 1002-1008 may be implemented as one or more web-based applications hosted on a remote server. The components 1002-1008 may also be implemented in a suite of mobile device applications or "apps." To illustrate, the components 1002-1008 may be implemented in an application, including but not limited to Adobe After Effects, Adobe Creative Cloud, Adobe Lightroom, Adobe Photoshop, and Adobe Premiere. The foregoing are either registered trademarks or trademarks of Adobe in the United States and/or other countries.

Figure 11:
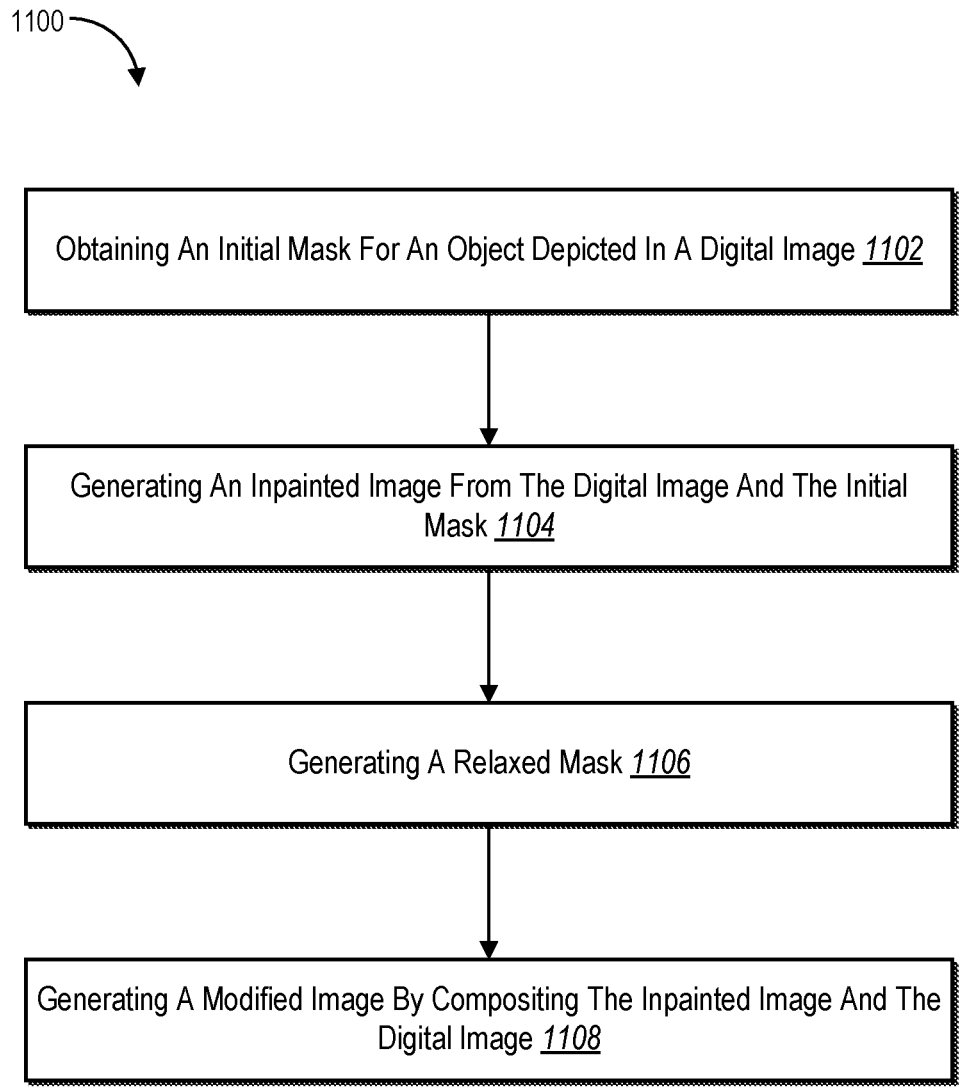
FIG. 11 illustrates a flowchart of a series of acts for inpainting a digital image in accordance with one or more embodiments.
Figure 12:
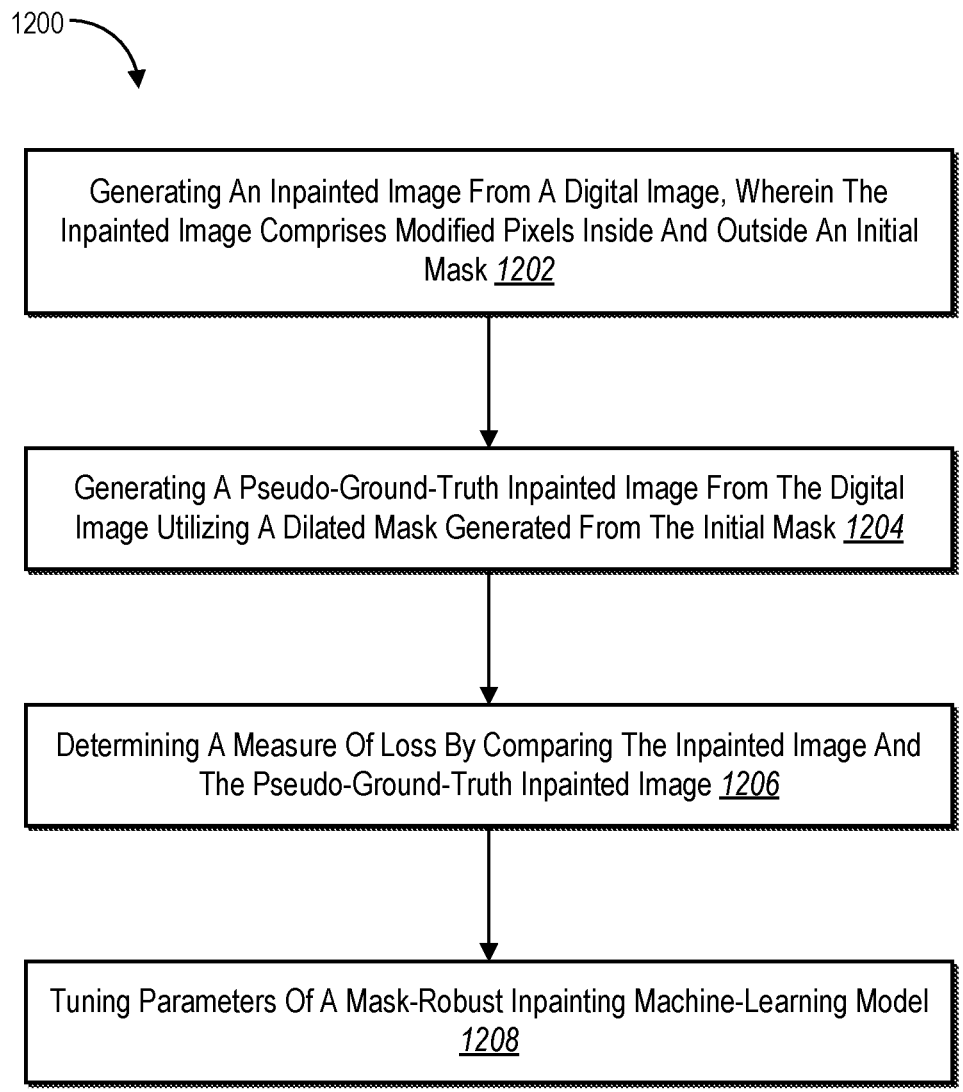
FIG. 12 illustrates a flowchart of a series of acts for training a mask-robust inpainting machine-learning model in accordance with one or more embodiments.

FIGS. 1-10, the corresponding text, and the examples provide a number of different methods, systems, devices, and non-transitory computer-readable media of the mask-robust image inpainting system 102. In addition to the foregoing, one or more embodiments can also be described in terms of flowcharts comprising acts for accomplishing a particular result, as shown in FIGS. 11 and 12. FIGS. 11 and 12 may be performed with more or fewer acts. Further, the acts may be performed in differing orders. Additionally, the acts described herein may be repeated or performed in parallel with one another or parallel with different instances of the same or similar acts.

As mentioned, FIG. 11 illustrates a flowchart of a series of acts 1100 for inpainting a digital image in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown in FIG. 11, the series of acts 1100 includes an act 1102 of obtaining an initial mask for an object depicted in a digital image, an act 1104 of generating an inpainted image from the digital image and the initial mask, an act 1106 of generating a relaxed mask, and an act 1108 of generating a modified image by compositing the inpainted image and the digital image.

In particular, the act 1102 can include obtaining an initial mask for an object depicted in a digital image, the act 1104 can include generating, utilizing a mask-robust inpainting machine-learning model, an inpainted digital image from the digital image and the initial mask, the act 1106 can include generating a relaxed mask that expands the initial mask, and the act 1108 can include generating a modified digital image by compositing the inpainted digital image and the digital image utilizing the relaxed mask. Alternatively, the act 1102 can include obtaining an initial mask for an object depicted in a digital image, the act 1104 can include generating, utilizing a mask-robust inpainting machine-learning model, an inpainted image from the digital image and the initial mask, the act 1106 can include generating a relaxed mask that expands the initial mask, and the act 1108 can include generating a modified image by compositing the inpainted image and the digital image utilizing the relaxed mask.

For example, in one or more embodiments, the series of acts 1100 includes wherein generating the inpainted digital image comprises generating, utilizing the mask-robust inpainting machine-learning model, modified pixels inside the initial mask and outside the initial mask. Furthermore, in some embodiments, the series of acts 1100 includes wherein generating the modified digital image comprises generating a masked inpainted digital image utilizing the relaxed mask. Moreover, in some implementations, the series of acts 1100 includes generating the modified digital image further comprises generating a masked background image from the digital image utilizing the relaxed mask; and compositing the inpainted digital image and the digital image comprises combining the masked inpainted digital image and the masked background image. In some cases, the series of acts 1100 includes wherein obtaining the initial mask comprises generating the initial mask utilizing an object segmentation machine-learning model. Furthermore, in some embodiments, the series of acts 1100 includes wherein generating the relaxed mask comprises generating, utilizing a mask refiner machine-learning model, the relaxed mask from the inpainted digital image and the digital image.

Moreover, in some implementations, the series of acts 1100 includes detecting an artifact in the modified digital image; generating, utilizing the mask-robust inpainting machine-learning model, a refined inpainted digital image from the modified digital image; and generating a refined digital image by compositing the refined inpainted digital image and the modified digital image. Additionally, in one or more embodiments, the series of acts 1100 includes generating, utilizing an object segmentation machine-learning model, an artifact mask for the artifact, wherein generating the refined inpainted digital image comprises generating, utilizing the mask-robust inpainting machine-learning model, refined pixels inside the artifact mask and outside the artifact mask.

In addition, in some implementations, the series of acts 1100 includes wherein generating the inpainted image comprises generating modified pixels inside the initial mask and outside the initial mask. Moreover, in some embodiments, the series of acts 1100 includes wherein compositing the inpainted image and the digital image comprises combining a masked inpainted image and a masked background image. Furthermore, in some implementations, the series of acts 1100 includes wherein generating the relaxed mask comprises utilizing a mask refiner machine-learning model to process the inpainted image and the digital image. Additionally, in some cases, the series of acts 1100 includes detecting an artifact in the modified image; generating an artifact mask for the artifact; generating, utilizing the mask-robust inpainting machine-learning model, a refined inpainted image comprising refined pixels inside the artifact mask and outside the artifact mask; and generating a refined image by compositing the refined inpainted image and the modified image.

As mentioned, FIG. 12 illustrates a flowchart of a series of acts 1200 for training a mask-robust inpainting machine-learning model in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer-readable medium can comprise instructions that, when executed by one or more processors, cause a computing device to perform the acts of FIG. 12. In some embodiments, a system can perform the acts of FIG. 12.

As shown in FIG. 12, the series of acts 1200 includes an act 1202 of generating an inpainted image from a digital image, wherein the inpainted image comprises modified pixels inside and outside an initial mask, an act 1204 of generating a pseudo-ground-truth inpainted image from the digital image utilizing a dilated mask generated from the initial mask, an act 1206 of determining a measure of loss by comparing the inpainted image and the pseudo-ground-truth inpainted image, and an act 1208 of tuning parameters of a mask-robust inpainting machine-learning model.

In particular, the act 1202 can include generating, utilizing the mask-robust inpainting machine-learning model, an inpainted image from the digital image, wherein the inpainted image comprises modified pixels inside and outside the initial mask, the act 1204 can include generating, utilizing an additional inpainting machine-learning model, a pseudo-ground-truth inpainted image from the digital image utilizing a dilated mask generated from the initial mask, the act 1206 can include determining a measure of loss by comparing the inpainted image and the pseudo-ground-truth inpainted image, and the act 1208 can include tuning parameters of the mask-robust inpainting machine-learning model based on the measure of loss.

For example, in some embodiments, the series of acts 1200 includes generating a relaxed mask that expands the initial mask; and generating a modified image by compositing the inpainted image and the digital image utilizing the relaxed mask, wherein comparing the inpainted image and the pseudo-ground-truth inpainted image comprises comparing the modified image and the pseudo-ground-truth inpainted image.

In addition, in one or more embodiments, the series of acts 1200 includes generating the relaxed mask utilizing a mask refiner machine-learning model; and training the mask refiner machine-learning model by tuning parameters of the mask refiner machine-learning model based on the measure of loss.

Moreover, in some implementations, the series of acts 1200 includes generating a perturbed mask from the initial mask; generating a relaxed mask that expands the perturbed mask; and generating a modified image by compositing the inpainted image and the digital image utilizing the relaxed mask, wherein comparing the inpainted image and the pseudo-ground-truth inpainted image comprises comparing the modified image and the pseudo-ground-truth inpainted image.

Furthermore, in one or more embodiments, the series of acts 1200 includes wherein generating the perturbed mask comprises: replacing the initial mask utilizing a free-form mask; or eroding a selection of boundary pixels of the initial mask. Alternatively, in some cases, the series of acts 1200 includes wherein generating the perturbed mask comprises: identifying pixel regions within the initial mask; determining probabilities that the pixel regions cover the object portrayed in the digital image; and removing one or more of the pixel regions from the initial mask based on the probabilities.

To further illustrate, in some embodiments, the series of acts 1200 includes generating, utilizing the mask-robust inpainting machine-learning model, an additional inpainted image from the digital image, wherein the additional inpainted image comprises additional modified pixels inside and outside the initial mask; determining an additional measure of loss by comparing the additional inpainted image and the pseudo-ground-truth inpainted image; and further tuning the parameters of the mask-robust inpainting machine-learning model based on the additional measure of loss.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
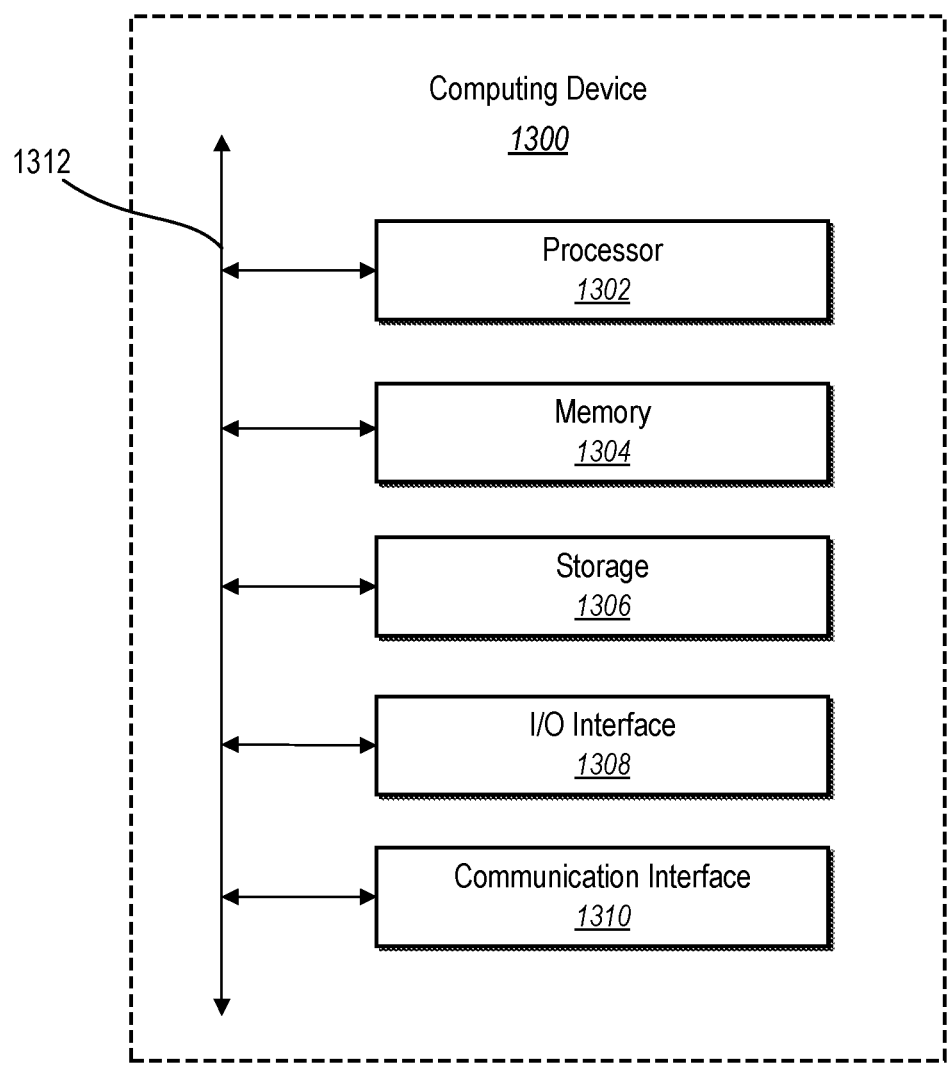
FIG. 13 illustrates a block diagram of an example computing device for implementing one or more embodiments of the present disclosure.

FIG. 13 illustrates a block diagram of an example computing device 1300 that may be configured to perform one or more of the processes described above. One will appreciate that one or more computing devices, such as the computing device 1300 may represent the computing devices described above (e.g., computing device(s) 1000, the server device(s) 106, or the client device 108). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes the memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes the storage device 1306 for storing data or instructions. As an example, and not by way of limitation, the storage device 1306 can include a non-transitory storage medium described above. The storage device 1306 may include a hard disk drive ("HDD"), flash memory, a Universal Serial Bus ("USB") drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller ("NIC") or network adapter for communicating with an Ethernet or other wire-based network or a wireless NIC ("WNIC") or wireless adapter for communicating with a wireless network, such as a WI-FI. The computing device 1300 can further include the bus 1312. The bus 1312 can include hardware, software, or both that connects components of computing device 1300 to each other.

In the foregoing description, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
one or more memory devices comprising a digital image and an initial mask for an object portrayed in the digital image; and
one or more processors coupled to the one or more memory devices that cause the system to train a mask-robust inpainting machine-learning model by:
generating, utilizing the mask-robust inpainting machine-learning model, an inpainted image from the digital image, wherein the inpainted image comprises modified pixels inside and outside the initial mask;
generating, utilizing an additional inpainting machine-learning model, a pseudo-ground-truth inpainted image from the digital image utilizing a dilated mask generated from the initial mask;
determining a measure of loss by comparing the inpainted image and the pseudo-ground-truth inpainted image; and
tuning parameters of the mask-robust inpainting machine-learning model based on the measure of loss.

2. The system of claim 1, wherein training the mask-robust inpainting machine-learning model further comprises:
generating a relaxed mask that expands the initial mask; and
generating a modified image by compositing the inpainted image and the digital image utilizing the relaxed mask,
wherein comparing the inpainted image and the pseudo-ground-truth inpainted image comprises comparing the modified image and the pseudo-ground-truth inpainted image.

3. The system of claim 2, wherein the one or more processors further cause the system to:
generate the relaxed mask utilizing a mask refiner machine-learning model; and
train the mask refiner machine-learning model by tuning parameters of the mask refiner machine-learning model based on the measure of loss.

4. The system of claim 1, wherein training the mask-robust inpainting machine-learning model further comprises:
generating a perturbed mask from the initial mask;
generating a relaxed mask that expands the perturbed mask; and
generating a modified image by compositing the inpainted image and the digital image utilizing the relaxed mask,
wherein comparing the inpainted image and the pseudo-ground-truth inpainted image comprises comparing the modified image and the pseudo-ground-truth inpainted image.

5. The system of claim 4, wherein generating the perturbed mask comprises:
replacing the initial mask utilizing a free-form mask; or
eroding a selection of boundary pixels of the initial mask.

6. The system of claim 4, wherein generating the perturbed mask comprises:
identifying pixel regions within the initial mask;
determining probabilities that the pixel regions cover the object portrayed in the digital image; and
removing one or more of the pixel regions from the initial mask based on the probabilities.

7. The system of claim 1, wherein training the mask-robust inpainting machine-learning model further comprises:
generating, utilizing the mask-robust inpainting machine-learning model, an additional inpainted image from the digital image, wherein the additional inpainted image comprises additional modified pixels inside and outside the initial mask;
determining an additional measure of loss by comparing the additional inpainted image and the pseudo-ground-truth inpainted image; and
further tuning the parameters of the mask-robust inpainting machine-learning model based on the additional measure of loss.

8. A computer-implemented method comprising training a mask-robust inpainting machine-learning model by:
generating, utilizing the mask-robust inpainting machine-learning model, an inpainted image from a digital image, wherein the inpainted image comprises modified pixels inside and outside an initial mask for an object portrayed in the digital image;
generating, utilizing an additional inpainting machine-learning model, a pseudo-ground-truth inpainted image from the digital image utilizing a dilated mask generated from the initial mask;
determining a measure of loss by comparing the inpainted image and the pseudo-ground-truth inpainted image; and
tuning parameters of the mask-robust inpainting machine-learning model based on the measure of loss.

9. The computer-implemented method of claim 8, wherein training the mask-robust inpainting machine-learning model further comprises:
generating a relaxed mask that expands the initial mask; and
generating a modified image by compositing the inpainted image and the digital image utilizing the relaxed mask,
wherein comparing the inpainted image and the pseudo-ground-truth inpainted image comprises comparing the modified image and the pseudo-ground-truth inpainted image.

10. The computer-implemented method of claim 9, further comprising:
generating the relaxed mask utilizing a mask refiner machine-learning model; and
training the mask refiner machine-learning model by tuning parameters of the mask refiner machine-learning model based on the measure of loss.

11. The computer-implemented method of claim 8, wherein training the mask-robust inpainting machine-learning model further comprises:
- generating a perturbed mask from the initial mask;
- generating a relaxed mask that expands the perturbed mask; and
- generating a modified image by compositing the inpainted image and the digital image utilizing the relaxed mask,
- wherein comparing the inpainted image and the pseudo-ground-truth inpainted image comprises comparing the modified image and the pseudo-ground-truth inpainted image.

12. The computer-implemented method of claim 11, wherein generating the perturbed mask comprises:
- replacing the initial mask utilizing a free-form mask; or
- eroding a selection of boundary pixels of the initial mask.

13. The computer-implemented method of claim 11, wherein generating the perturbed mask comprises:
- identifying pixel regions within the initial mask;
- determining probabilities that the pixel regions cover the object portrayed in the digital image; and
- removing one or more of the pixel regions from the initial mask based on the probabilities.

14. The computer-implemented method of claim 8, wherein training the mask-robust inpainting machine-learning model further comprises:
- generating, utilizing the mask-robust inpainting machine-learning model, an additional inpainted image from the digital image, wherein the additional inpainted image comprises additional modified pixels inside and outside the initial mask;
- determining an additional measure of loss by comparing the additional inpainted image and the pseudo-ground-truth inpainted image; and
- further tuning the parameters of the mask-robust inpainting machine-learning model based on the additional measure of loss.

15. A non-transitory computer-readable medium storing instructions thereon that, when executed by at least one processor, cause the at least one processor to train a mask-robust inpainting machine-learning model by:
- generating, utilizing the mask-robust inpainting machine-learning model, an inpainted image from a digital image, wherein the inpainted image comprises modified pixels inside and outside an initial mask for an object portrayed in the digital image;
- generating, utilizing an additional inpainting machine-learning model, a pseudo-ground-truth inpainted image from the digital image utilizing a dilated mask generated from the initial mask;
- determining a measure of loss by comparing the inpainted image and the pseudo-ground-truth inpainted image; and
- tuning parameters of the mask-robust inpainting machine-learning model based on the measure of loss.

16. The non-transitory computer-readable medium of claim 15, wherein training the mask-robust inpainting machine-learning model further comprises:
- generating a relaxed mask that expands the initial mask; and
- generating a modified image by compositing the inpainted image and the digital image utilizing the relaxed mask,
- wherein comparing the inpainted image and the pseudo-ground-truth inpainted image comprises comparing the modified image and the pseudo-ground-truth inpainted image.

17. The non-transitory computer-readable medium of claim 15, wherein training the mask-robust inpainting machine-learning model further comprises:
- generating a perturbed mask from the initial mask;
- generating a relaxed mask that expands the perturbed mask; and
- generating a modified image by compositing the inpainted image and the digital image utilizing the relaxed mask,
- wherein comparing the inpainted image and the pseudo-ground-truth inpainted image comprises comparing the modified image and the pseudo-ground-truth inpainted image.

18. The non-transitory computer-readable medium of claim 17, wherein generating the perturbed mask comprises:
- replacing the initial mask utilizing a free-form mask; or
- eroding a selection of boundary pixels of the initial mask.

19. The non-transitory computer-readable medium of claim 17, wherein generating the perturbed mask comprises:
- identifying pixel regions within the initial mask;
- determining probabilities that the pixel regions cover the object portrayed in the digital image; and
- removing one or more of the pixel regions from the initial mask based on the probabilities.

20. The non-transitory computer-readable medium of claim 15, wherein training the mask-robust inpainting machine-learning model further comprises:
- generating, utilizing the mask-robust inpainting machine-learning model, an additional inpainted image from the digital image, wherein the additional inpainted image comprises additional modified pixels inside and outside the initial mask;
- determining an additional measure of loss by comparing the additional inpainted image and the pseudo-ground-truth inpainted image; and
- further tuning the parameters of the mask-robust inpainting machine-learning model based on the additional measure of loss.

* * * * *